US006376576B2

(12) United States Patent
Kang et al.

(10) Patent No.: US 6,376,576 B2
(45) Date of Patent: Apr. 23, 2002

(54) CERAMER COMPOSITION INCORPORATING FLUORO/SILANE COMPONENT AND HAVING ABRASION AND STAIN RESISTANT CHARACTERISTICS

(75) Inventors: Soonkun Kang, Lake Elmo; George G. I. Moore, Afton, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/733,186

(22) Filed: Dec. 8, 2000

Related U.S. Application Data

(60) Division of application No. 09/389,252, filed on Sep. 3, 1999, now Pat. No. 6,245,833, which is a continuation-in-part of application No. 09/209,117, filed on Dec. 10, 1998, now abandoned, which is a continuation-in-part of application No. 09/072,506, filed on May 4, 1998, now abandoned.

(51) Int. Cl.$^7$ .............................................. C08L 83/00
(52) U.S. Cl. ............. 523/202; 106/187.12; 106/187.13; 106/187.14; 106/187.17; 523/203; 523/205; 523/209
(58) Field of Search ................................ 523/202, 203, 523/205, 209; 106/287.12, 287.13, 287.14, 287.17

(56) References Cited

U.S. PATENT DOCUMENTS

| | | |
|---|---|---|
| 2,801,185 A | 7/1957 | Iler |
| 3,712,706 A | 1/1973 | Stamm |
| 3,787,467 A | 1/1974 | Lucking et al. |
| 3,924,929 A | 12/1975 | Holmen |
| 3,940,359 A | 2/1976 | Chambers |
| 4,025,159 A | 5/1977 | McGrath |
| 4,177,315 A | 12/1979 | Ubersax |
| 4,188,451 A | 2/1980 | Humphery |
| 4,202,600 A | 5/1980 | Burke et al. |
| 4,243,618 A | 1/1981 | Van Arnam |
| 4,260,220 A | 4/1981 | Whitehead |
| 4,265,938 A | 5/1981 | Jack et al. |
| 4,311,763 A | 1/1982 | Conroy |
| 4,340,319 A | 7/1982 | Johnson, Jr. et al. |
| 4,349,598 A | 9/1982 | White |
| 4,409,285 A | 10/1983 | Swerdlow |
| 4,440,590 A | 4/1984 | Collins et al. |
| 4,455,205 A | 6/1984 | Olson et al. |
| 4,476,281 A | 10/1984 | Vaughn, Jr. |
| 4,478,876 A | 10/1984 | Chung |
| 4,478,909 A | 10/1984 | Taniguchi et al. |
| 4,481,254 A | 11/1984 | Fukushima et al. |
| 4,486,504 A | 12/1984 | Chung |
| 4,490,230 A | 12/1984 | Fletcher |
| 4,491,508 A | 1/1985 | Olson et al. |
| 4,518,649 A | 5/1985 | Wang et al. |
| 4,522,958 A | 6/1985 | Das et al. |

(List continued on next page.)

FOREIGN PATENT DOCUMENTS

| | | |
|---|---|---|
| EP | 052 427 B1 | 5/1982 |
| EP | 052 427 A1 | 5/1982 |
| EP | 153 289 A2 | 8/1985 |
| EP | 286 225 B1 | 10/1988 |
| EP | 337 695 A2 | 10/1989 |
| EP | 410 798 B1 | 1/1991 |
| EP | 424 007 B1 | 4/1991 |
| EP | 0 166 363 B1 | 8/1991 |
| EP | 491 251 A1 | 6/1992 |
| EP | 492 545 A2 | 7/1992 |
| EP | 537 669 A1 | 4/1993 |
| EP | 576 247 B1 | 12/1993 |
| EP | 620 255 A1 | 10/1994 |
| EP | 628 610 A1 | 12/1994 |
| EP | 675 087 | 10/1995 |
| EP | 0 738 777 A2 | 10/1996 |
| EP | 0 797 111 A2 | 9/1997 |

(List continued on next page.)

OTHER PUBLICATIONS

American Society for Testing and Materials, Designation: D 523–89, AStandard Test Method for Specular Gloss,@ pp. 33–37 (1989).

American Society for Testing and Materials, Designation: D–968–93, AStandard Test Methods for Abrasion Resistance of Organic Coatings by Falling Abrasive,@ pp. 87–90 (1993).

American Society for Testing and Materials, Designation: D–1003–61, AStandard Method of Test for Haze and Luminous Transmittance of Transparent Plastics,@ pp. 569–576 (1961).

American Society for Testing and Materials, Designation: D–1003–92, AStandard Test Method for Haze and Luminous Transmittance of Transparent Plastics,@ pp. 357–361 (1992).

American Society for Testing and Materials, Designation: D–1003–97, AStandard Test Method for Haze and Luminous Transmittance of Transparent Plastics,@ pp. 196–201 (1998).

American Society for Testing and Materials, Designation: D–1–44–94, A Standard Test Method for Resistance of Transparent Plastics to Surface Abrasion,@ pp. 219–222 (1994).

American Society for Testing and Materials, Designation: D 2457–97, A Standard Test Method for Specular Gloss of Plastic Films and Solid Plastics,@ pp. 9–13 (1997).

(List continued on next page.)

Primary Examiner—D. S. Nakarani
(74) Attorney, Agent, or Firm—Stephen W. Buckingham; David R. Cleveland

(57) ABSTRACT

A curable ceramer composition, coated articles and methods for making and curing the composition. The curable ceramer comprises a fluoro/silane, a crosslinkable silane, a curable binder precursor, and a colloidal inorganic oxide. The ceramer has a long shelf life before cure and can be used to provide cured ceramer coatings and articles having stain resistance, abrasion resistance and hardness.

10 Claims, No Drawings

U.S. PATENT DOCUMENTS

| | | |
|---|---|---|
| 4,536,420 A | 8/1985 | Rickert, Jr. |
| 4,571,365 A | 2/1986 | Ashlock et al. |
| 4,576,850 A | 3/1986 | Martens |
| 4,576,864 A | 3/1986 | Krautter et al. |
| 4,588,258 A | 5/1986 | Hoopman |
| 4,594,379 A | 6/1986 | Funaki et al. |
| 4,596,662 A | 6/1986 | Walker et al. |
| 4,596,745 A | 6/1986 | Chao |
| 4,642,266 A | 2/1987 | Funaki et al. |
| 4,664,960 A | 5/1987 | Ovshinsky |
| 4,664,966 A | 5/1987 | Bailey et al. |
| 4,682,852 A | 7/1987 | Weber |
| 4,719,146 A | 1/1988 | Hohage et al. |
| 4,726,706 A | 2/1988 | Attar |
| 4,735,632 A | 4/1988 | Oxman et al. |
| 4,753,548 A | 6/1988 | Forrer |
| 4,755,425 A | 7/1988 | Huang |
| 4,764,564 A | 8/1988 | Schmidt et al. |
| 4,772,488 A | 9/1988 | Pinch et al. |
| 4,775,219 A | 10/1988 | Appledorn et al. |
| 4,797,024 A | 1/1989 | Forrer |
| 4,814,207 A | 3/1989 | Siol et al. |
| 4,818,596 A | 4/1989 | Cook et al. |
| 4,837,069 A | 6/1989 | Bescup et al. |
| 4,844,946 A | 7/1989 | Komatsu et al. |
| 4,844,976 A | 7/1989 | Huang |
| 4,875,798 A | 10/1989 | May |
| 4,885,332 A | 12/1989 | Bilkadi |
| 4,895,428 A | 1/1990 | Nelson et al. |
| 4,906,070 A | 3/1990 | Cobb, Jr. |
| 4,906,523 A | 3/1990 | Bilkadi et al. |
| 4,908,230 A | 3/1990 | Miller |
| 4,929,666 A | 5/1990 | Schmidt et al. |
| 5,006,624 A | 4/1991 | Schmidt et al. |
| 5,042,924 A | 8/1991 | Terasaki et al. |
| 5,053,177 A | 10/1991 | Vetter et al. |
| 5,073,404 A | 12/1991 | Huang |
| 5,104,929 A | 4/1992 | Bilkadi |
| 5,117,304 A | 5/1992 | Huang et al. |
| 5,126,394 A | 6/1992 | Revis et al. |
| 5,134,021 A | 7/1992 | Hosono et al. |
| 5,176,943 A | 1/1993 | Woo |
| 5,177,304 A | 1/1993 | Nagel |
| 5,210,248 A | 5/1993 | Babirad et al. |
| 5,244,935 A | 9/1993 | Oshibe et al. |
| 5,258,225 A | 11/1993 | Katsamberis |
| 5,270,080 A | 12/1993 | Mino et al. |
| 5,274,159 A | 12/1993 | Pellerite et al. |
| 5,294,662 A | 3/1994 | Moore et al. |
| 5,307,438 A | 4/1994 | Bilkadi et al. |
| 5,314,980 A | 5/1994 | Morrison |
| 5,316,825 A | 5/1994 | Nakai et al. |
| 5,324,566 A | 6/1994 | Ogawa et al. |
| 5,368,941 A | 11/1994 | Blizzard et al. |
| 5,374,483 A | 12/1994 | Wright |
| 5,382,639 A | 1/1995 | Moore et al. |
| 5,391,210 A | 2/1995 | Bilkadi et al. |
| 5,393,590 A | 2/1995 | Caspari |
| 5,418,304 A | 5/1995 | Mueller et al. |
| 5,541,049 A | 7/1996 | Ballerini et al. |
| 5,608,003 A | 3/1997 | Zhu |
| 5,667,335 A | 9/1997 | Khieu et al. |
| 5,677,050 A | 10/1997 | Bilkadi et al. |
| 5,706,133 A | 1/1998 | Orensteen et al. |
| 5,708,048 A | 1/1998 | Medford et al. |
| 5,760,126 A | 6/1998 | Engle et al. |
| 5,859,086 A | 1/1999 | Freund et al. |
| 5,880,212 A | 3/1999 | Nakagawa et al. |
| 5,888,290 A | 3/1999 | Engle et al. |
| 5,939,182 A | 8/1999 | Huang et al. |
| 6,132,861 A | 10/2000 | Kang et al. |
| 6,245,833 B1 * | 6/2001 | Kang et al. ............ 428/403 |

FOREIGN PATENT DOCUMENTS

| | | |
|---|---|---|
| EP | 816 452 A2 | 1/1998 |
| GB | 2 249 041 | 4/1992 |
| JP | 59-176329 | 10/1984 |
| JP | 3-41402 | 2/1991 |
| JP | 3-50288 | 3/1991 |
| JP | 7-11030 | 1/1995 |
| JP | 02-260145 | 10/1995 |
| JP | 98 03 0040 | 11/1997 |
| JP | 10028700 | 2/1998 |
| WO | WO 92/17337 | 10/1992 |
| WO | WO 95/16522 | 6/1995 |
| WO | WO 95/30539 | 11/1995 |
| WO | WO 95/32237 | 11/1995 |
| WO | WO 96/21700 | 7/1996 |
| WO | WO 96/36669 | 11/1996 |
| WO | WO 97/00917 | 1/1997 |
| WO | WO 97/00995 | 1/1997 |
| WO | WO 97/01599 | 1/1997 |
| WO | WO 97/45502 | 12/1997 |
| WO | WO 99/02611 | 1/1999 |

OTHER PUBLICATIONS

American Society for Testing and Materials, Designation: D–2486–89, A Standard Test Method for Scrub Resistance of Interior Latex Flat Wall Paints,@ pp. 91–93 (1989).

American Society for Testing and Materials, Designation: D–2486–96, A Standard Test Method for Scrub Resistance Wall Paints,@ pp. 92–94 (1996).

American Society for Testing and Materials, Designation: D–3359–90, A Standard Test Methods for Measuring Adhesion by Tape Test,@ pp. 511–514 (1990).

American Society for Testing and Materials, Designation: D–3359–93, A Standard Test Methods for Measuring Adhesion by Tape Test,@ pp. 433–438 (1994).

American Society for Testing and Materials, Designation: D–3359–97, A Standard Test Methods for Measuring Adhesion by Tape Test,@ pp. 368–374 (1998).

American Society for Testing and Materials, Designation: D–3884–92, A Standard Test Method for Abrasion Resistance of Textile Fabrics (Rotary Platform, Double–Head Method),@ pp. 160–164 (1992).

American Society for Testing and Materials, Designation: D–4280–96, A Standard Specification for Extended Life Type, Nonplowable, Prismitic, Raised, Retroreflective Pavement Markers,@ pp. 430–436 (1996).

American Society for Testing and Materials, Designation: E–810–94, A Standard Test Method for Coefficient of Retroreflection of Retroreflective Sheeting,@ pp. 362–367 (1994).

American Society for Testing and Materials, Designation: G–26–88, A Standard Practice for Operating Light Exposure Apparatus (Xenon–Arc Type) with and without Water for Exposure of Nonmetallic Materials,@ pp. 963–971 (1988).

American Society for Testing and Materials, Designation: G–26–90, A Standard Practice for Operating Light–Exposure Apparatus (Xenon–Are Type) With or Without Water for Exposure of Nonmetallic Materials,@ 1069–1077 (1990).

American Society for Testing and Materials, Designation: G–26–96, A Standard Practice for Operating Light–Exposure Apparatus (Xenon–Arc Type) With or Without Water for Exposure of Nonmetallic Materials,@ pp. 1258–1267 (1996).

Floch et al., AA Scratch–Resistant Single–Layer Anti–reflective Coating by a Low Temperature Sol–Gel Route, @*SPIE*, vol. 1758, Sol–Gel Optics II, pp. 135–149 (1992).

Iler, A, The Chemistry of Silica,@ John Wiley & Sons, New York, title page, copyright page, table of contents (1979).

Lewis, et al., A Ultraviolet–Curable, Abrasion–Resistant and Weatherable Coatings with Improved Adhesion@,*J. of Appl. Polymer Science*, 42:1551–1556 (1991).

Pleuddeman, A Silane Coupling Agents,@ New York, title page, table of contents, pp. 20–23 and 96–99 (1982).

Schmidt, A Chemistry of Material Preparation By The Sol–Gel Process@,*J. Non–Cryst. Solids*, 100:51–64 (1988).

Zisman, W. A., A Contact Angle, Wettability and Adhesion,@ Advances in Chemistry, series 43, American Chemical Society, Washington, D.C. (1964).

American Society for Testing Materials, Designation: D 1000–93, "Standard Test Method for Pressure–Sensitive Adhesive–Coated Tapes Used for Electrical and Electronic Applications," pp.320–337 (1999).

American Society for Testing Materials, Designation: D 1044–90, "Standard Test Method for Resistance of Transparent Plastics to Surface Abrasion," pp. 378–381 (1991).

American Society for Testing Materials, Designation: D 3359–95a, "Standard Test Methods for Measuring Adhesion by Tape Test," pp.355–361 (1997).

* cited by examiner

CERAMER COMPOSITION INCORPORATING FLUORO/SILANE COMPONENT AND HAVING ABRASION AND STAIN RESISTANT CHARACTERISTICS

RELATED APPLICATION INFORMATION

This application is a division of prior application Ser. No. 09/389,252, filed Sep. 3, 1999, now U.S. Pat. No. 6,245,833 B1, which was a continuation-in-part of prior application Ser. No. 09/209,117, filed Dec. 10, 1998, now abandoned, which was a continuation-in-part of then prior application Ser. No. 09/072,506, filed May 4, 1998, now abandoned.

FIELD OF THE INVENTION

This invention relates to abrasion resistant protective coatings and methods of making the same. This invention also relates to abrasion resistant coatings derived from a ceramer composite.

BACKGROUND OF THE INVENTION

Thermoplastic and thermosetting polymers are used to form a wide variety of structures for which optical clarity, i.e., good light transmittance, is a desired characteristic. Examples of such structures include camera lenses, eyeglass lenses, binocular lenses, retroreflective sheeting, non-retroreflective graphic displays, automobile windows, building windows, train windows, boat windows, aircraft windows, vehicle headlamps and taillights, display cases, eyeglasses, watercraft hulls, road pavement markings, overhead projectors, stereo cabinet doors, stereo covers, furniture, bus station plastic, television screens, computer screens, watch covers, instrument gauge covers, bakeware, optical and magneto-optical recording disks, and the like. Examples of polymer materials used to form these structures include thermosetting or thermoplastic polycarbonate, poly (meth)acrylate, polyurethane, polyester, polyamide, polyimide, phenoxy, phenolic resin, cellulosic resin, polystyrene, styrene copolymer, epoxy, and the like.

Many of these thermoplastic and thermosetting polymers have excellent rigidity, dimensional stability, transparency, and impact resistance, but unfortunately have poor abrasion resistance. Consequently, structures formed from these polymers are susceptible to scratches, abrasion, and similar damage.

To protect these structures from physical damage, a tough, abrasion resistant "hardcoat" layer may be coated onto the structure. Many previously known hardcoat layers incorporate a binder matrix formed from radiation curable prepolymers such as (meth)acrylate functional monomers. Such hardcoat compositions have been described, for example, in Japanese patent publication JP02-260145, U.S. Pat. No. 5,541,049, and U.S. Pat. No. 5,176,943. One particularly excellent hardcoat composition is described in WO 96/36669 A1. This publication describes a hardcoat formed from a "ceramer" used, in one application, to protect the surfaces of retroreflective sheeting from abrasion. As defined in this publication, a ceramer is a hybrid polymerizable composite (preferably transparent) having inorganic oxide particles, e.g., silica, of nanometer dimensions dispersed in an organic binder matrix.

Many ceramers are derived from aqueous sols of inorganic colloids according to a process in which a radiation curable binder matrix precursor (e.g., one or more different radiation curable monomers, oligomers, or polymers) and other optional ingredients (such as surface treatment agents that interact with the colloids of the sol, surfactants, antistatic agents, leveling agents, initiators, stabilizers, sensitizers, antioxidants, crosslinking agents, and crosslinking catalysts) are blended into the aqueous sol. The resultant composition is then dried to remove substantially all of the water. The drying step may also be referred to as "stripping". An organic solvent may then be added, if desired, in amounts effective to provide the composition with viscosity characteristics suitable for coating the composition onto the desired substrate. After coating, the composition can be dried to remove the solvent and then exposed to a suitable source of energy to cure the radiation curable binder matrix precursor.

SUMMARY OF THE INVENTION

The manufacture of ceramer compositions can be challenging due to the extremely sensitive characteristics of the colloids of the aqueous sol. Particularly, adding other ingredients, such as binder matrix precursors or other additives, to such sols tends to destabilize the colloids, causing the colloids to flocculate, e.g., precipitate out of the sol. Flocculation is not conducive to forming high quality coatings. First, flocculation results in local accumulations of particles. These accumulations are typically large enough to scatter light which results in a reduction of the optical clarity of the resultant coating. In addition, the accumulation of particles may cause nibs or other defects in the resultant coatings. In short, flocculation of the colloids causes the resultant ceramer composition to be cloudy, or hazy, and thus, coatings formed from the ceramer composition could be cloudy or hazy as well. Conversely, if colloid flocculation were to be avoided, the resultant ceramer composition would remain optically clear, allowing coatings containing the ceramer composition to be optically clear as well.

Thus, the manufacture of ceramer compositions may require special processing conditions that allow binder precursors or additives to be incorporated into a sol to avoid colloid flocculation. Unfortunately, the processing conditions developed to manufacture one ceramer composition are often not applicable to the manufacture of a ceramer containing different components.

One method of manufacturing ceramers from aqueous, colloidal sols involves incorporating one or more N,N-disubstituted (meth)acrylamide monomers, preferably N,N-dimethyl (meth)acrylamide (hereinafter referred to as "DMA"), into the binder matrix precursor. The presence of such a radiation curable material advantageously stabilizes the colloids, reducing the sensitivity of the colloids to the presence of other ingredients that might be added to the sol. By stabilizing the colloids, the presence of materials like DMA makes ceramers easier to manufacture. In addition to enhancing colloid stability, DMA provides other benefits. For example, ceramer compositions containing DMA show better adhesion to polycarbonate or acrylic substrates and better processability as compared to otherwise identical ceramer compositions lacking DMA.

Unfortunately, the use of DMA also has some drawbacks. A ceramer composition incorporating DMA tends to attract or bind with acidic contaminants (coffee, soda pop, citrus juices, and the like) in the environment. Thus, ceramers incorporating DMA tend to be more vulnerable to staining.

Accordingly, it would be desirable to find an alternative approach for making ceramers without DMA, or with reduced amounts of DMA, such that (1) the colloids are sufficiently stable during ceramer manufacture, (2) the resultant ceramer is stain resistant, or (3) the resultant ceramer retains excellent hardness and abrasion resistance.

Fluorochemicals have low surface energy characteristics that would satisfy at least one of the aforementioned criteria. Specifically, because compositions with lower surface energy generally tend to show better stain resistance, the incorporation of a fluorochemical into a ceramer would be likely to enhance the ceramer's stain resistance. Unfortunately, however, the incorporation of fluorochemicals into a ceramer sol is extremely difficult. For example, because fluorochemicals are both hydrophobic (incompatible with water) and oleophobic (incompatible with nonaqueous organic substances), the incorporation of a fluorochemical into a ceramer sol often results in phase separation, e.g., colloid flocculation. This undesirable colloid flocculation can also result during the stripping process, when water is typically removed from the blended aqueous sol.

Consequently, it would further be desirable to find a way to provide ceramers with good stain resistance using fluorochemicals or other stain resistant additives, while avoiding compatibility and hardness problems generally associated with fluorochemicals.

The present invention provides a method for effectively incorporating a fluorochemical into a ceramer composition. According to the invention, a nonionic fluorochemical containing both a fluorinated moiety and a hydrolyzable silane moiety (the "fluoro/silane component") can be successfully incorporated into a ceramer sol, without causing appreciable colloid flocculation, to provide ceramer coatings with surprisingly long shelf lives and excellent stain resistant characteristics. Ceramers incorporating such a fluorochemical also retain a high level of abrasion resistance and hardness.

The present invention involved not just discovering the advantages offered by the fluoro/silane component, but also involved developing processing techniques that would allow the fluoro/silane component to be incorporated into the sol without causing flocculation of the colloids. Flocculation can be substantially prevented if the fluoro/silane component is added to an admixture containing a colloidal inorganic oxide and a curable binder precursor (the "first admixture") in the presence of a surface treatment agent containing both a hydrolyzable silane moiety and a polymerizable moiety (a "crosslinkable silane component"). The fluoro/silane component and the crosslinkable silane component may be combined to form a second admixture, which is then combined with the first admixture to form a third admixture which after stripping will provide a curable ceramer composition of the present invention. Alternatively, the crosslinkable silane component may be combined with the first admixture individually, after which the fluoro/silane component may then be added. In contrast, if the fluoro/silane component is added to the sol individually in the absence of, e. g., before, the crosslinkable silane component, colloid flocculation tends to occur as soon as the crosslinkable silane component is added or during stripping. The effects caused by the order of addition of the crosslinkable silane and the fluoro/silane tend to be observed in larger scale processes rather than in bench scale processes. In bench scale processes, it may be possible to add the fluoro/silane component to the sol in the absence of the crosslinkable silane without observing appreciable flocculation.

The present invention also provides ceramer compositions containing a mixture of inorganic oxides. The oxides are present as a major portion of one inorganic oxide and a minor portion of a different inorganic oxide, resulting in cured ceramer coatings with improved physical properties compared to coatings made with only one inorganic oxide.

Accordingly, in one aspect, the present invention relates to a method of making a curable ceramer composition by combining a fluoro/silane component with an admixture containing one or more colloidal inorganic oxides and a curable binder precursor. The fluoro/silane component is added to the admixture in the presence of a crosslinkable silane component. The fluoro/silane component contains a hydrolyzable silane moiety and a fluorinated moiety. The crosslinkable silane component contains a hydrolyzable silane moiety and a polymerizable moiety other than a silane moiety. The curable binder precursor contains one or more polymerizable moieties copolymerizable with the polymerizable moiety of the crosslinkable silane component. At least a portion of the colloidal inorganic oxide is surface treated by the fluoro/silane component. The resultant ceramer composition may be used directly if desired. When the colloids are provided as an aqueous sol, the ceramer composition is typically stripped and optionally diluted in an appropriate solvent to provide a viscosity suitable for coating onto a desired substrate.

In another aspect, the present invention relates to a method of making an abrasion resistant ceramer coating using free-radically-curable embodiments of the ceramer composition described above. At least a portion of a substrate surface is coated with the ceramer composition, after which the coated substrate is irradiated with an amount of curing energy under conditions effective to at least partially cure the coated free-radically-curable ceramer composition, whereby an abrasion resistant ceramer coating is formed on the substrate.

In another aspect, the present invention relates to a free-radically-curable ceramer composition. The ceramer composition includes a free-radically-curable binder precursor; and a plurality of surface treated, colloidal inorganic oxide particles that are surface treated with the fluoro/silane component.

In another aspect, the present invention relates to a cured, abrasion resistant ceramer composite derived from this free-radically-curable ceramer composition.

The ceramer composition of the present invention can be utilized to provide substrates with durability, dry soil resistance, long-lasting stain release properties and in some cases, water and oil repellency. Thus, the present invention also relates to a composite structure, comprising a polymeric substrate having a coatable surface. A cured, abrasion resistant ceramer coating of the present invention is provided on the coatable surface of the substrate.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

One embodiment of a preferred ceramer composition of the present invention is prepared from ingredients containing a compound having at least one hydrolyzable silane moiety and at least one fluorinated moiety ("fluoro/silane component"), a compound having at least one hydrolyzable silane moiety and at least one polymerizable moiety other than a silane moiety ("crosslinkable silane component"), a curable binder precursor having at least one polymerizable moiety that is co-polymerizable with the polymerizable moiety of the crosslinkable silane component, and one or more colloidal inorganic oxides. Preferably, the fluoro/silane component and the crosslinkable silane component are nonionic in embodiments of the invention in which the colloidal inorganic oxide is provided as a sol. The use of nonionic materials minimizes the tendency of the colloids to flocculate when the ingredients are combined. Preferably, the polymerizable moieties of the crosslinkable silane component and the curable binder precursor are free-radically-curable.

A wide range of these materials may be incorporated into the ceramer composition with beneficial results. Preferably, the composition includes from about 4 to about 20 parts by weight of the crosslinkable silane component per 1 part by weight of the fluoro/silane component. It is additionally preferred that the composition includes from about 10 to about 80 parts by weight of the curable binder precursor per 100 parts by weight (including the weight of the dispersant or other liquid medium) of the colloidal inorganic oxide. It is also preferred that the composition includes about 1 to about 20 parts by weight of the crosslinkable silane and fluoro/silane components per 100 parts by weight of the colloidal inorganic oxide (again including the weight of the dispersant or other liquid medium). In embodiments of the invention in which the colloids are provided as a sol, e.g., an aqueous sol, the sol preferably includes about 2 to about 50, preferably about 20 to about 50 percent by weight of the colloids.

Expressed on a solids basis, the ceramer compositions of the invention preferably contain about 50 to about 60 weight percent curable binder precursor and about 35 to about 40 weight percent colloidal inorganic oxide solids, with the balance (totaling about 5 to about 10 weight percent) being crosslinkable silane and fluoro/silane.

Suitable fluoro/silane components include those having at least one hydrolyzable or hydrolyzed group and a fluorochemical group. Additionally, suitable fluoro/silane components can be polymers, oligomers, or monomers and typically contain one or more fluorochemical moieties that have a fluorinated carbon chain having from about 3 to about 20 carbon atoms, more preferably from about 6 to about 14 carbon atoms. These fluorochemical moieties can contain straight chain, branched chain, or cyclic fluorinated alkylene groups or any combination thereof. The fluorochemical moieties are preferably free of polymerizable olefinic unsaturation but can optionally contain catenary (in-chain) heteroatoms such as oxygen, divalent or hexavalent sulfur, or nitrogen. Perfluorinated groups are preferred, but hydrogen or halogen atoms can also be present as substituents, provided that no more than one atom of either is present for every two carbon atoms.

A class of useful fluoro/silane components can be represented by the following general formula:

(1)

In this formula, $S_y$ represents a hydrolyzable silane moiety; $R_f$ represents a fluorinated moiety; r is at least 1, preferably 1 to 4, more preferably 1; s is at least 1, preferably 1 to 4, more preferably 1; and W is a linking group having a valency of r+s.

Preferably, each $R_f$ moiety of Formula (1) independently is a monovalent or divalent, nonionic, perfluoro moiety that may be linear, branched, or cyclic. If $R_f$ is divalent, both valent sites of such an $R_f$ moiety preferably are linked to W directly as illustrated by the following formula:

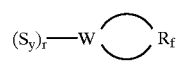
(2)

From Formula (2), it can be seen that each divalent $R_f$ moiety bonds to two valent sites on W. Accordingly, s of Formula (1) is incremented by 2 for each such divalent moiety.

Any of a wide variety of nonionic perfluoro moieties are suitable for use as $R_f$. Representative examples of suitable perfluoro moieties include perfluoroalkyl, perfluoroalkylene, perfluoroalkoxy, or oxyperfluoroalkylene moieties having 1 to 20, preferably 3 to 20 carbon atoms. Perfluorinated aliphatic moieties are the most preferred perfluoro moieties.

Preferably, each $S_y$ moiety of Formula (1) independently is a monovalent or divalent, nonionic hydrolyzable silane moiety that may be linear, branched, or cyclic. The term "hydrolyzable silane moiety" refers to a hydrolyzable moiety containing at least one Si atom bonded to at least one halogen atom or at least one oxygen atom in which the oxygen atom preferably is a constituent of an acyloxy group or an alkoxy group. Thus, representative examples of preferred hydrolyzable silane moieties suitable for use as $S_y$ may be represented by the following formulae:

(3)

(4)

(5)

(6)

Generally, $R^1$ and $R^2$ independently may be any nonionic, monovalent substituent other than hydrogen. Additionally, $r^1$ and $R^2$ may be linear, branched, or cyclic. In embodiments according to Formula (4), $R^1$ and $R^2$ may be co-members of a ring structure. Thus, representative examples of moieties suitable for use as $R^1$ and $R^2$ include any alkyl, aryl, alkaryl, acyl, alkenyl, arylene or heterocyclic moieties, combinations thereof, or the like. Any of such moieties, if cyclic, may include a plurality of rings if desired. For example, aryl moieties may be aryl-aryl structures. In preferred embodiments, each of $R^1$ and $R^2$ is independently an alkyl group of 1 to 4 carbon atoms or an acyl group such as acetyl ($CH_3CO—$) or substituted or unsubstituted benzoyl ($C_6H_5CO—$). Most preferably each of $R^1$ and $R^2$ independently is a lower alkyl group of 1 to 4 carbon atoms, more preferably $CH_3—$.

Z is preferably a halogen atom or —OR$^3$. In embodiments in which —OR$^3$ is an alkoxy group, R$^3$ preferably is an alkyl group of 1 to 8, more preferably 1 to 4, and most preferably 1 to 2 carbon atoms. In embodiments in which —OR$^3$ is an acyloxy group, R$^3$ preferably has the formula —C(O)R$^4$, wherein R$^4$ generally may be any nonionic, monovalent moiety other than hydrogen. Representative examples of moieties suitable as R$^4$ include any alkyl, aryl, or alkaryl moieties, and combinations thereof. Any of such R$^4$ moieties, if cyclic, may include a plurality of rings if desired. In preferred embodiments, R$^4$ is CH$_3$—.

Generally, W of Formula (1) may be any nonionic moiety capable of linking the at least one S$_y$ moiety and the at least one R$_f$ moiety together. Preferably, W contains a backbone of 4 to 30 atoms and may contain one or more moieties such as an alkylene moiety, an ether moiety, an ester moiety, a urethane moiety, a carbonate moiety, an imide moiety, an amide moiety, an aryl moiety, an alkaryl moiety, an alkoxyaryl moiety, sulfonyl, nitrogen, oxygen, combinations of these, and the like.

A preferred class of compounds according to Formula (1) is represented by any of the formulae

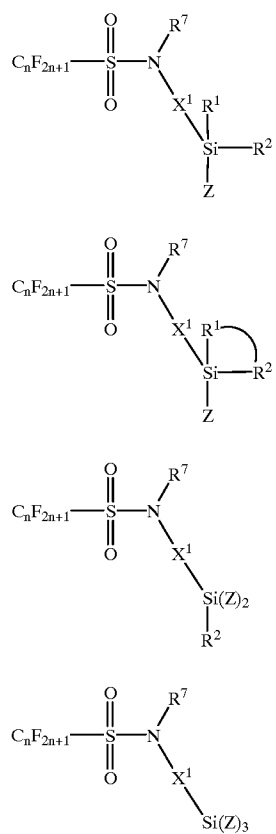

wherein n is 1 to 20, preferably 3 to 20; R$^7$ is a monovalent moiety, preferably an aryl, alkyl, or alkaryl moiety, more preferably an alkyl moiety of 1 to 4 carbon atoms; X$^1$ is an alkylene group of 1 to 10 carbon atoms, and Z, R$^1$, R$^2$ and R$^3$ are as defined above.

Representative specific examples of preferred compounds according to Formula (1) include the following compounds:

C$_5$F$_{11}$CH$_2$OCH$_2$CH$_2$CH$_2$Si(OCH$_2$CH$_3$)$_3$

C$_7$F$_{15}$CH$_2$OCH$_2$CH$_2$CH$_2$Si(OCH$_2$CH$_3$)$_3$

C$_7$F$_{15}$CH$_2$OCH$_2$CH$_2$CH$_2$SiCl$_3$

C$_8$F$_{17}$CH$_2$CH$_2$OCH$_2$CH$_2$CH$_2$SiCl$_3$

C$_{18}$F$_{37}$CH$_2$OCH$_2$CH$_2$CH$_2$CH$_2$SiCl$_3$

CF$_3$CF(CF$_2$Cl)CF$_2$CF$_2$SO$_2$N(CH$_3$)CH$_2$CH$_2$CH$_2$SiCl$_3$

C$_8$F$_{17}$SO$_2$N(CH$_3$)CH$_2$CH$_2$CH$_2$Si(OCH$_3$)$_3$

C$_8$F$_{17}$SO$_2$N(CH$_3$)CH$_2$CH$_2$CH$_2$Si(OCH$_3$)$_3$

C$_8$F$_{17}$SO$_2$N(CH$_2$CH$_3$)CH$_2$CH$_2$CH$_2$Si(OCH$_3$)$_{av1.9}$[(OCH$_2$CH$_2$)$_{av6.1}$OCH$_3$]$_{av1.1}$

C$_7$F$_{15}$CH$_2$O(CH$_2$)$_3$Si(OCH$_2$CH$_2$OCH$_2$CH$_2$OH)$_3$

C$_7$F$_{15}$CH$_2$CH$_2$Si(CH$_3$)Cl$_2$

C$_8$F$_{17}$CH$_2$CH$_2$SiCl$_3$

Cl$_3$SiCH$_2$CH$_2$CH$_2$OCH$_2$(OCF$_2$CF$_2$)$_8$CH$_2$OCH$_2$CH$_2$CH$_2$SiCl$_3$

CF$_3$O(CF$_2$CF(CF$_3$)O)$_4$CF$_2$C(═O)NHCH$_2$CH$_2$CH$_2$Si(OC$_2$H$_5$)$_3$

CF$_3$O(C$_3$F$_6$O)$_4$(CF$_2$O)$_3$CF$_2$CH$_2$OC(═O)NHCH$_2$CH$_2$CH$_2$Si(OCH$_3$)$_3$

Cl$_3$SiCH$_2$CH$_2$OCH$_2$(CF$_2$CF$_2$O)$_8$(CF$_2$O)$_4$CF$_2$CH$_2$CH$_2$CH$_2$SiCl$_3$

C$_8$F$_{17}$CONHC$_6$H$_4$Si(OCH$_3$)$_3$

C$_8$F$_{17}$SO$_2$N(CH$_2$CH$_3$)CH$_2$CH$_2$CH$_2$Si(OCH$_3$)$_{av1}$(OCH$_2$CH$_2$(OCH$_2$CH$_2$)$_2$OCH$_3$)$_{av2}$

A particularly preferred embodiment of a fluoro/silane component according to Formula (1), for example, is represented by the formula

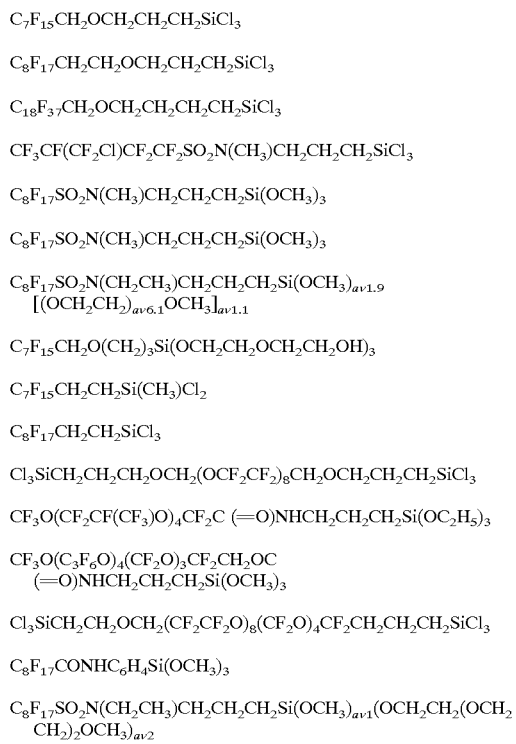

(11)

The compound according to Formula (11) is commercially available from Minnesota Mining and Manufacturing Company, St. Paul, Minn. under the trade designation FC405. Methods of making such a compound and fluoro/silane compounds in general are described in U.S. Pat. No. 3,787,467 to Lucking et al., the disclosure of which is herein incorporated by reference.

Useful fluoro/silane components can be prepared, e.g., by reacting (a) at least one fluorochemical compound having at least one reactive functional group with (b) a functionalized silane having from one to about three hydrolyzable groups and at least one alkyl, aryl, or alkoxyalkyl group that is substituted by at least one functional group that is capable of reacting with the functional group of the fluorochemical compound(s). Such methods are disclosed in U.S. Pat. No. 5,274,159 (Pellerite et al.).

Crosslinkable silane components suitable for use in the ceramer composition of the present invention are commercially available from numerous sources. Generally, suitable crosslinkable silane components contain at least one hydrolyzable silane moiety and at least one polymerizable moiety other than a silane moiety. The polymerizable moiety preferably contains either (meth)acrylate, allyl, styryl, amino, or epoxy functionalities, while the hydrolyzable silane group is usually an alkoxy silyl moiety (generally methoxy or ethoxy) which serves as a binding site to hydroxy-functional inorganic substrates via displacement of the alkoxy groups. Additional information concerning crosslinkable silane components may be found in the book by E. P. Pleuddeman ("Silane coupling Agents", Plenum Press, N.Y., 1982, pp. 20–23 and 97) as well as in technical reports by S. Sterman and J. G. Marsden entitled "Theory of Mechanisms of Silane Coupling Agents in Glass Reinforced and Filled Thermoplastic and Thermosetting Resin Systems", Union Carbide Corporation, New York, and "A Guide to Dow Corning Silane Coupling Agents", Dow Corning Corporation, 1985, pp. 2–13, the disclosures of which are incorporated by reference herein.

Crosslinkable silane components suitable for use in the ceramer compositions of the present invention may be polymers, oligomers, or monomers and may preferably be represented by the formula

$$(S_y)_q\text{—}W^o\text{—}(R_c)_p \tag{12}$$

In Formula (12), $S_y$ represents a hydrolyzable silane moiety as defined above with respect to Formulae (1) and (2); $R_c$ is a moiety containing curable functionality, preferably free-radically-curable functionality; q is at least 1, preferably 1 to 4, more preferably 1; p is at least 1, preferably 1 to 4, more preferably 1; and $W^o$ is a linking group having a valency of q+p. Compounds according to Formula (12) and methods of making such compounds are described in U.S. Pat. No. 5,314,980, the disclosure of which is incorporated by reference herein.

Generally, $W^o$ of Formula (12) may be any nonionic moiety capable of linking the at least one $S_y$ moiety and the at least one $R_c$ moiety together. Preferably, $W^o$ has a backbone of 4 to 30 atoms and may contain one or more moieties such as an alkylene moiety, an ether moiety, an ester moiety, a urethane moiety, a carbonate moiety, an imide moiety, an amide moiety, an aryl moiety, an alkaryl moiety, an alkoxyaryl moiety, arylsulfonyl moiety, nitrogen, oxygen, combinations of these, and the like.

Embodiments of compounds according to Formula (12) in the form of silane functional (meth)acrylates include, for example, 3-(methacryloxy)propyl trimethoxysilane, 3-acryloxypropyl trimethoxysilane, 3-(methacryloxy) propyltriethoxysilane, 3-(methacryloxy) propylmethyldimethoxysilane, 3-(acryloxypropyl) methyldimethoxysilane, 3-(methacryloxy) propyldimethylethoxysilane, 3-(methacryloxy) methyltriethoxysilane, 3-(methacryloxy) methyltrimethoxysilane, 3-(methacryloxy) propyldimethylethoxysilane, 3-methacryloxypropenyl trimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltrisisobutoxysilane, vinyltriisopropenoxysilane, vinyltris(2-methoxyethoxy)silane, and mixtures thereof. Of these, 3-(methacryloxy)propyl trimethoxysilane, 3-acryloxypropyl trimethoxysilane, 3-(methacryloxy) propylmethyldimethoxysilane and 3-(methacryloxy) propyldimethylethoxysilane are preferred. Furthermore, embodiments of crosslinkable silane components according to Formula (18) in the form of silane functional polyolefins can be produced from commercially available starting materials by any of several methods.

Exemplary crosslinkable silane components are described in the above-mentioned Pleuddeman reference and in U.S. Pat. Nos. 4,491,508 and 4,455,205 to Olsen et al.; U.S. Pat. Nos. 4,478,876 and 4,486,504 to Chung; and U.S. Pat. No. 5,258,225 to Katsamberis, all of which are incorporated herein by reference.

In the practice of the present invention, free-radically-curable functionality refers to functional groups directly or indirectly pendant from a monomer, oligomer, or polymer backbone (as the case may be) that participate in crosslinking or polymerization reactions upon exposure to a suitable source of radiant (e.g., UV or thermal) curing energy. Such functionality generally includes not only groups that crosslink via a cationic mechanism upon radiation exposure but also groups that crosslink via a free radical mechanism. Representative examples of radiation polymerizable moieties suitable in the practice of the present invention include epoxy groups, (meth)acrylate groups, olefinic carbon-carbon double bonds, allylether groups, styrene groups, (meth) acrylamide groups, combinations of these, and the like. Representative examples of curing energy include electromagnetic energy (e.g., infrared energy, microwave energy, visible light, ultraviolet light, and the like), accelerated particles (e.g., electron beam energy), or energy from electrical discharges (e.g., coronas, plasmas, glow discharge, or silent discharge).

The colloidal inorganic oxides for use in the present invention include particles, powders, and oxides in solution. The colloidal inorganic oxides are desirably substantially spherical in shape, and relatively uniform in size (e. g., they have a substantially monodisperse size distribution or a polymodal distribution obtained by blending two or more substantially monodisperse distributions). It is further preferred that the colloidal inorganic oxides be and remain substantially non-aggregated (substantially discrete), as colloidal aggregation can result in precipitation, gellation, or a dramatic increase in sol viscosity and can reduce both adhesion to the substrate and optical clarity. Finally, it is preferable that the colloidal inorganic oxides be characterized by an average particle diameter of about 1 nanometer to about 200 nanometers, preferably from about 1 nanometer to about 100 nanometers, more preferably from about 2 nanometers to about 75 nanometers. These size ranges facilitate ease of dispersion of the particles into coatable ceramer compositions and provide ceramer coatings that are smoothly surfaced and optically clear. Average particle size of the colloids can be measured using transmission electron microscopy to count the number of particles of a given diameter.

A wide range of colloidal inorganic oxides can be used in the present invention. Representative examples include colloidal titania, colloidal alumina, colloidal zirconia, colloidal vanadia, colloidal chromia, colloidal iron oxide, colloidal antimony oxide, colloidal tin oxide, and mixtures thereof. The colloidal inorganic oxide can be a single oxide such as silica, a combination of oxides such as silica and aluminum oxide, or a core of an oxide of one type (or a core of a material other than a metal oxide) on which is deposited an oxide of another type.

In one preferred embodiment, for example, the inorganic oxide may be a mixture containing a major amount of a first or primary inorganic oxide, e.g., silica, and a minor amount of a second or additive oxide, preferably an aluminum oxide such as a sodium aluminate. As used herein, "major amount" means that the inorganic oxide includes a sufficient amount of the primary oxide (preferably at least about 80% by weight, more preferably at least about 95% by weight, and most preferably at least about 98% by weight) such that the composite properties of the resultant ceramer are primarily due to such primary oxide. "Minor amount" means that the inorganic oxides include a sufficient amount of the additive oxide to enhance at least one property of the resultant uncured or cured ceramer composition.

It has now been discovered that it is much easier homogeneously to disperse inorganic oxides in uncured ceramer compositions or within sols from which the ceramers are to be derived when the inorganic oxide includes both a primary inorganic oxide and at least one additive inorganic oxide. For example, cured ceramer coatings incorporating silica and aluminum oxide particles have shown better abrasion resistance and improved processability than otherwise identical ceramer coatings having no additive oxide.

The optimum amount of an additive oxide to be incorporated into a ceramer composition will depend upon a number of factors including the type(s) of additive oxide(s) being used, the desired end use of the ceramer composition, and the like. Generally, if too little of an additive oxide is used, little benefit will be observed. On the other hand, if too much of an additive oxide is used, then the resultant cured ceramer coating may be hazier than desired, and abrasion resistance may be reduced. As one suggested guideline for preferred embodiments in which the corresponding cured ceramer coating is desired to be optically clear and abrasion resistant, the ceramer composition may include about 100 parts by weight of silica and about 0.01 to about 10, preferably about 1 to about 2 parts by weight of an oxide other than silica, preferably an aluminum oxide.

The colloidal inorganic oxide is desirably provided in the form of a sol (e.g., a colloidal dispersion of inorganic oxide particles in liquid media), especially sols of amorphous silica. Unlike other forms in which the colloidal inorganic oxide particles may be supplied (e.g., fumed silica which contains irregular aggregates of colloidal particles), colloids of such sols tend to be substantially monodisperse in size and shape and thus enable the preparation of ceramer compositions exhibiting good optical clarity, smoothness, and surprisingly good adhesion to substrates. Preferred sols generally contain from about 2 to about 50 weight percent, preferably from about 25 to about 45 weight percent, of colloidal inorganic oxide.

Sols useful in the practice of the present invention may be prepared by methods well known in the art. For example, silica hydrosols containing from about 2 to about 50 percent by weight of silica in water are generally useful and can be prepared, e.g., by partially neutralizing an aqueous solution of an alkali metal silicate with base to a pH of about 8 or about 9 (such that the resulting sodium content of the solution is less than about 1 percent by weight based on sodium oxide). Sols useful in the practice of the present invention may also be prepared in a variety of forms, including hydrosols (where water serves as the liquid medium), organosols (where organic liquids are used as the liquid medium), and mixed sols (where the liquid medium contains both water and an organic liquid). See, e.g., the descriptions of the techniques and forms given in U.S. Pat. Nos. 2,801,185 (Iler) and 4,522,958 (Das et al.), whose descriptions are incorporated herein by reference, as well as those given by R. K. Iler in *The Chemistry of Silica*, John Wiley & Sons, New York (1979).

Due to their low cost, and environmental considerations, silica hydrosols (also known as aqueous silica sols) are preferred for use in preparing the ceramer compositions of the invention. The surface chemistry of hydrosols makes them particularly well suited for use in the ceramer compositions of the present invention. For example, when colloidal inorganic oxide particles are dispersed in water, the sol is stabilized to some degree due to common electrical charges that develop on the surface of each particle. The common electrical charges tend to promote dispersion rather than agglomeration or flocculation, because the similarly charged particles repel one another.

Hydrosols are commercially available in both acidic and basic forms and with a variety of particle sizes and concentrations under such trademarks as "LUDOX" (E. I. DuPont de Nemours and Co., Inc. Wilmington, Del.), "NYACOL" (Nyacol Co., Ashland, Mass.), and "NALCO" (Nalco Chemical Co., Oak Brook, Ill.). Additional examples of suitable colloidal silicas are described in U.S. Pat. No. 5,126,394, incorporated herein by reference. Although either acidic or basic sols are suitable for use in the ceramer compositions of the present invention, it is desirable to match the pH of the sol with that of the curable binder precursor in order to minimize the tendency of the colloids of the sol to flocculate when the sol and the curable binder precursor are combined. For example, if the sol is acidic, the curable binder precursor also preferably is acidic. On the other hand, if the sol is basic, the curable binder precursor also preferably is basic.

In one preferred ceramer embodiment of the present invention to be derived from an aqueous silica sol, it may be desirable to add a minor amount of a water soluble compound such as sodium aluminate ($NaAlO_2$) to the sol. Addition of a compound such as sodium aluminate provides a sol, and corresponding ceramer composition, that include both silica colloids and aluminum oxides. Use of an additive oxide such as aluminum oxide makes it easier to obtain homogeneous ceramer compositions, improved abrasion resistance, and improved adhesion in wet or dry environments. This is believed to be attributable to the enhanced hydrolytic stability of ceramer composites including silica colloids and aluminum oxides.

The sols may include counterions in order to counter the surface charge of the colloids. Depending upon pH and the kind of colloids being used, the surface charges on the colloids can be negative or positive. Thus, either cations or anions are used as counter ions. Examples of cations suitable for use as counter ions for negatively charged colloids include $Na^+$, $K^+$, $Li^+$, a quaternary ammonium cation such as $NR'_4{}^+$, (wherein each R' may be any monovalent moiety, but is preferably H or lower alkyl such as $CH_3$), combinations of these, and the like. Examples of counter anions suitable for use as counter ions for positively charged colloids include $HSO_3{}^-$ and $R-COO^-$ where R represents an alkyl carboxylate.

As one option, suitable curable binder precursors can be selected from any curable thermoplastic or thermosetting polymer that contains moieties capable of crosslinking with the $R_c$ (refer to Formula (12)) moiety of the crosslinkable silane component. Examples of such polymers include polyurethane, polycarbonate, polyester, polyamide, polyimide, phenoxy, phenolic resin, cellulosic resin, polystyrene, styrene copolymer, poly(meth)acrylate, epoxy, silicone resin, combination of these, and the like. As another option, the curable binder precursor can be in the form of prepolymeric materials which can be copolymerized or homopolymerized in situ after the ceramer composition has been coated onto a substrate.

As one example of an approach using prepolymeric materials, the curable binder precursor may contain one or more free-radically-curable monomers, oligomers, polymers, or combinations of these having pendant free-radically-curable functionality which allows the materials to polymerize or crosslink using a source of curing energy such as electron beam radiation, ultraviolet radiation, visible light, and the like. Preferred free-radically-curable monomers, oligomers, or polymers each include one or more free-radically-curable, carbon-carbon double bonds such that the average functionality of such materials is greater than one free-radically-curable carbon-carbon double bond per molecule. Materials having such moieties are capable of copolymerization or crosslinking with each other via such carbon-carbon double bond functionality.

Generally, the term "monomer" as used herein refers to a single, one unit molecule capable of combination with itself or other monomers to form oligomers or polymers. The term "oligomer" refers to a compound that is a combination of 2 to 20 monomers. The term "polymer" refers to a compound that is a combination of 21 or more monomers.

Generally, ceramer compositions including oligomeric or polymeric free-radically-curable binder precursors tend to have higher viscosities than ceramer compositions including only monomeric free-radically-curable binder precursors. Accordingly, in applications involving techniques such as spin coating or the like in which it is desirable for the ceramer composition to have a low viscosity, e.g., a viscosity of less than 200 centipoise measured at 25° C. using a Brookfield viscometer with any suitable spindle operated at a spindle speed in the range from 20 to 50 rpm, it is preferred that at least 50%, by weight, more preferably substantially all, of any prepolymeric binder precursors are monomeric free-radically-curable binder precursors.

Free-radically-curable monomers suitable in the practice of the present invention are preferably selected from combinations of mono, di, tri, tetra, penta, and hexafunctional free-radically-curable monomers. Various amounts of the mono, di, tri, tetra, penta, and hexafunctional free-radically-curable monomers may be incorporated into the present invention, depending upon the desired properties of the final ceramer coating.

For example, in order to provide ceramer coatings with higher levels of abrasion and impact resistance, it is desirable for the ceramer composition to include one or more multifunctional free-radically-curable monomers, and preferably at least both di- and tri-functional free-radically-curable monomers, such that the free-radically-curable monomers incorporated into the ceramer composition have an average free-radically-curable functionality per molecule of greater than 1. Preferred ceramer compositions of the present invention may include about 1 to about 35 parts by weight of monofunctional free-radically-curable monomers, 0 to about 75 parts by weight of difunctional free-radically-curable monomers, about 1 to about 75 parts by weight of trifunctional free-radically-curable monomers, 0 to about 75 parts by weight of tetrafunctional free-radically-curable monomers, 0 to about 75 parts by weight of pentafunctional free-radically-curable monomers, and 0 to about 75 parts by weight of hexafunctional free-radically-curable monomers, subject to the proviso that the free-radically-curable monomers have an average functionality of greater than 1, preferably 1.1 to 4, more preferably 1.5 to 3.

One representative class of monofunctional free-radically-curable monomers suitable in the practice of the present invention includes compounds in which a carbon-carbon double bond is directly or indirectly linked to an aromatic ring. Examples of such compounds include styrene, alkylated styrene, alkoxy styrene, free-radically-curable naphthalene, alkylated vinyl naphthalene, alkoxy vinyl naphthalene, combinations of these, and the like. Another representative class of monofunctional, free-radically-curable monomers includes compounds in which a carbon-carbon double bond is attached to an cycloaliphatic, heterocyclic, or aliphatic moiety such as 5-vinyl-2-norbornene, 4-vinyl pyridine, 2-vinyl pyridine, 1-vinyl-2-pyrrolidinone, 1-vinyl caprolactam, 1-vinylimidazole, N-vinyl formamide, and the like.

Another representative class of such monofunctional free-radically-curable monomers include (meth)acrylate functional monomers that incorporate moieties of the formula:

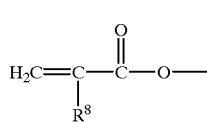

(13)

wherein $R^8$ is a monovalent moiety, such as hydrogen, halogen, methyl, or the like. Representative examples of such monomers include, linear, branched, or cycloaliphatic esters of (meth)acrylic acid containing from 1 to 20, preferably 1 to 8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and may be linear, branched, or cyclic; isobornyl (meth)acrylate; vinyl acetate; allyl (meth)acrylate, and the like.

Such (meth)acrylate functional monomers may also include other kinds of reactive functionality such as hydroxyl functionality, nitrile functionality, epoxy functionality, carboxylic functionality, thiol functionality, amine functionality, sulfonyl functionality, combinations of these, and the like. Representative examples of such free-radically-curable compounds include glycidyl (meth)acrylate, (meth)acrylonitrile, β-cyanoethyl-(meth)acrylate, 2-cyanoethoxyethyl (meth)acrylate, p-cyanostyrene, p-(cyanomethyl)styrene, an ester of an α,β-unsaturated carboxylic acid with a diol, e.g., 2-hydroxyethyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an α,β-unsaturated carboxylic acid with caprolactone; an alkanol vinyl ether such as 2-hydroxyethyl vinyl ether; 4-vinylbenzyl alcohol; allyl alcohol; p-methylol styrene, (meth)acryloyloxyethyl trimethyl ammonium chloride, (meth)acrylamidopropyl trimethylammonium chloride, vinylbenzyl trimethylammonium chloride, 2-hydroxy-3-allyloxypropyl trimethylammonium chloride, (meth)acryloxypropyl dimethylbenzylammonium chloride, dimethylaminoethyl (meth)acrylate, vinylbenzyl trimethylammonium chloride, N-(3-sulfopropyl)-N-(meth)acryloxyethyl-N,N-dimethylammonium betaine, 2-[(meth)acryloxy]ethyl trimethylammonium methosulfate, N-(3-sulfopropyl)-N-(meth)acrylamidopropyl-N,N-dimethylammonium betaine, N,N-dimethylamino (meth)acrylate, (meth)acryloyloxyethyl acid phosphate, (meth)acrylamidopropyl sodium sulfonate, sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, maleic anhydride, mixtures thereof, and the like.

Another class of monofunctional, free-radically-curable monomers that may optionally be used in the practice of the present invention, but is in no way required, includes one or more N,N-disubstituted (meth)acrylamides. Use of an N,N-disubstituted (meth)acrylamide provides numerous advantages. For example, the use of this kind of monomer provides ceramer coatings which show improved adhesion to polycarbonate substrates. Further, use of this kind of monomer also provides ceramer coatings with improved weatherability and toughness. Preferably, the N,N-disubstituted (meth)acrylamide has a molecular weight in the range from about 99 to about 500, preferably from about 99 to about 200, in order to minimize the tendency, if any, of the colloidal inorganic oxide to flocculate and precipitate out of the ceramer composition.

The N,N-disubstituted (meth)acrylamide monomers generally have the formula:

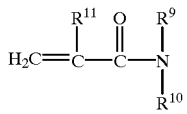

(14)

wherein $R^9$ and $R^{10}$ are each independently hydrogen, a ($C_1$–$C_8$)alkyl group (linear, branched, or cyclic) optionally having hydroxy, halide, carbonyl, and amido functionalities, a ($C_1$–$C_8$)alkylene group optionally having carbonyl and amido functionalities, a ($C_1$–$C_4$)alkoxymethyl group, a ($C_4$–$C_{18}$)aryl or heteroaryl group, a ($C_1$–$C_3$)alk($C_4$–$C_{18}$)aryl group, or a ($C_4$–$C_{18}$)heteroaryl group; with the proviso that only one of $R^9$ and $R^{10}$ is hydrogen; and $R^{11}$ is hydrogen, a halogen, or a methyl group. Preferably, $R^9$ is a ($C_1$–$C_4$)alkyl group; $R^{10}$ is a ($C_1$–$C_4$)alkyl group; and $R^{11}$ is hydrogen, or a methyl group. $R^9$ and $R^{10}$ can be the same or different. More preferably, each of $R^9$ and $R^{10}$ is $CH_3$, and $R^{11}$ is hydrogen.

Examples of such suitable (meth)acrylamides are N-(3-bromopropion-amidomethyl) acrylamide, N-tert-butylacrylamide, N,N-dimethylacrylamide, N,N-diethylacrylamide, N-(5,5-dimethylhexyl)acrylamide, N-(1,1-dimethyl-3-oxobutyl)acrylamide, N-(hydroxymethyl) acrylamide, N-(isobutoxymethyl)acrylamide, N-isopropylacrylamide, N-methylacrylamide, N-ethylacrylamide, N-methyl-N-ethylacrylamide, N-(fluoren-2-yl)acrylamide, N-(2-fluorenyl)-2-methylacrylamide, 2,3-bis(2-furyl)acrylamide, N,N'-methylene-bis acrylamide. A particularly preferred (meth)acrylamide is N,N-dimethyl (meth)acrylamide.

Other examples of free-radically-curable monomers include alkenes such as ethene, 1-propene, 1-butene, 2-butene (cis or trans), compounds including an allyloxy moiety, and the like.

Multifunctional (meth)acrylate compounds suitable for use in the curable binder precursor are commercially available from a number of different suppliers. Alternatively, such compounds can be prepared using a variety of well known reaction schemes. For example, according to one approach, a (meth)acrylic acid or acyl halide or the like is reacted with a polyol having at least two, preferably 2 to 6, hydroxyl groups. This approach can be represented by the following schematic reaction scheme which, for purposes of illustration, shows the reaction between acrylic acid and a triol:

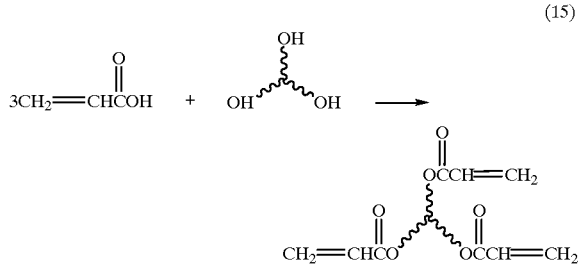

(15)

This reaction scheme as illustrated provides a trifunctional acrylate. To obtain di, tetra, penta, or hexa functional compounds, corresponding diol, tetrols, pentols, and hexols could be used in place of the triol, respectively.

According to another approach, a hydroxy or amine functional (meth)acrylate compound or the like is reacted with a polyisocyanate, or isocyanurate, or the like having 2 to 6 NCO groups or the equivalent. This approach can be represented by the following schematic reaction scheme which, for purposes of illustration, shows the reaction between hydroxyethyl acrylate and a triisocyanate:

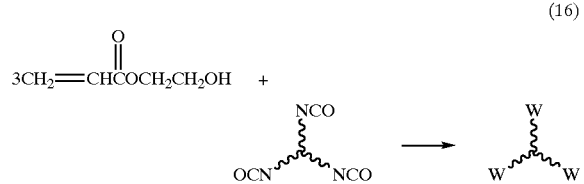

(16)

wherein W is

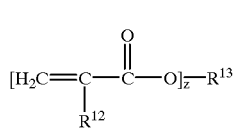

This reaction scheme as illustrated provides a trifunctional (meth)acrylate. To obtain di, tetra, penta, or hexa functional compounds, corresponding multifunctional isocyanates could be used in place of the triisocyanate, respectively.

A preferred class of multifunctional (meth)acryl functional compounds includes one or more multifunctional, ethylenically unsaturated esters of (meth)acrylic acid and may be represented by the following formula:

(17)

wherein $R^{12}$ is hydrogen, halogen or a ($C_1$–$C_4$)alkyl group; $R^{13}$ is a polyvalent organic group having m valencies and can be cyclic, branched, or linear, aliphatic, aromatic, or heterocyclic, having carbon, hydrogen, nitrogen, nonperoxidic oxygen, sulfur, or phosphorus atoms; and z is an integer designating the number of acrylic or methacrylic groups in the ester and has a value of 2 to 7. Preferably, $R^{12}$ is hydrogen, methyl, or ethyl, $R^{13}$ has a molecular weight of about 14 to 100, and m has a value of 2 to 6. More preferably, z has a value of 2 to 5, most preferably 3 to 4. Where a mixture of multifunctional acrylates or methacrylates are used, z preferably has an average value of about 1.05 to 3.

Specific examples of suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4-butanetriol, 1,2,5-pentanetriol, 1,3,6-hexanetriol, and 1,5,10-decanetriol; the triacrylic acid and trimethacrylic acid esters of tris (hydroxyethyl) isocyanurate; the tetraacrylic and tetramethacrylic acid esters of aliphatic tetraols, such as 1,2,3,4-butanetetraol, 1,1,2,2,-tetramethylolethane, 1,1,3,3-tetramethylolpropane, and pentaerythritol triacrylate; the pentaacrylic acid and pentamethacrylic acid esters of aliphatic pentols such as adonitol; the hexaacrylic acid and hexamethacrylic acid esters of hexanols such as sorbitol and dipentaerythritol; the diacrylic acid and dimethacrylic acid esters of aromatic diols such as resorcinol, pyrocatechol, bisphenol A, and bis(2-hydroxyethyl) phthalate; the trimethacrylic acid ester of aromatic triols such as pyrogallol, phloroglucinol, and 2-phenyl-2,2-dimethylolethanol; and the hexaacrylic acid and hexamethacrylic acid esters of dihydroxy ethyl hydantoin; and mixtures thereof.

In addition to the fluoro/silane component, the crosslinkable silane component, the curable binder precursor, and the colloidal inorganic oxide, the ceramer composition may further include a solvent and other optional additives. For example, if desired, the ceramer composition may include a solvent to reduce the viscosity of the ceramer composition in order to enhance the ceramer coating characteristics. The appropriate viscosity level depends upon various factors such as the coating thickness, application technique, and the type of substrate material onto which the ceramer composition is applied. In general, the viscosity of the ceramer composition at 25° C. is about 1 to about 200 centipoise, preferably about 3 to about 75 centipoise, more preferably about 4 to about 50 centipoise, and most preferably about 5 to about 20 centipoise when measured using a Brookfield viscometer with a No. 2 cv spindle at a spindle speed of 20 rpm. In general, sufficient solvent is used such that the solids content of the ceramer composition is about 5 to about 95%, preferably about 10 to about 50%, more preferably about 15 to about 30%, by weight solids.

The solvent is selected to be compatible with the other components included in the ceramer composition. As used in this context, "compatible" means that there is minimal phase separation between the solvent and the other components. Additionally, the solvent should be selected such that the solvent does not adversely affect the curing properties of the ceramer composition or attack the material of the substrate. Furthermore, the solvent should be selected such that it has an appropriate drying rate. That is, the solvent should not dry too slowly, which would slow down the process of making a coated substrate. It should also not dry too quickly, which could cause defects such as pin holes or craters in the resultant ceramer coating. The solvent can be an organic solvent, water, or combinations thereof. Representative examples of suitable solvents include lower alcohols such as ethanol, methanol, isopropyl alcohol, and n-butanol; ketones such as methyl ethyl ketone and methyl isobutyl ketone; glycols; glycol ethers; combinations thereof, and the like. Most preferably, the solvent is isopropanol. Using the procedure described below for making a ceramer composition, the solvent may also include a small amount, e.g. about 2% by weight, of water.

The ceramer compositions of the present invention also may include a leveling agent to improve the flow or wetting of the ceramer composition onto the substrate. If the ceramer composition does not properly wet the substrate, this can lead to visual imperfections (e.g., pin holes or ridges) in the ceramer coating. Examples of leveling agents include, but are not limited to, alkylene oxide terminated polysiloxanes such as that available under the trade designation "DOW 57" (a mixture of dimethyl-, methyl-, and (polyethylene oxide acetate-capped) siloxane) from Dow Corning, Midland, Michigan, and fluorochemical surfactants such as those available under the trade designations "FC430" and "FC431" from Minnesota Mining and Manufacturing Company Co., St. Paul, Minn. The ceramer composition can include an amount of a leveling agent effective to impart the desired result. Preferably, the leveling agent is present in an amount up to about 3% by weight, and more preferably about 0.5 to about 1%, based on the total weight of the ceramer composition solids. It should be understood that combinations of different leveling agents can be used if desired.

During the manufacture of an abrasion resistant, ceramer coating of the type including a free-radically-curable binder precursor, the coated ceramer composition preferably is exposed to an energy source, e.g., radiation, which initiates the curing process of the ceramer coating. This curing process typically occurs via a free radical mechanism, which can require the use of a free radical initiator (simply referred to herein as an initiator, e.g., a photoinitiator or a thermal initiator) depending upon the energy source used. If the energy source is an electron beam, the electron beam generates free radicals and no initiator is typically required. If the energy source is ultraviolet light, or visible light, an initiator is often required. When the initiator is exposed to one of these energy sources, the initiator generates free radicals, which then initiates the polymerization and crosslinking.

Examples of suitable free radical initiators that generate a free radical source when exposed to thermal energy include, but are not limited to, peroxides such as benzoyl peroxide, azo compounds, benzophenones, and quinones. Examples of photoinitiators that generate a free radical source when exposed to visible light radiation include, but are not limited to, camphorquinones/alkyl amino benzoate mixtures. Examples of photoinitiators that generate a free radical source when exposed to ultraviolet light include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin, benzoin methyl ether, benzoin ethyl ether, benzoin isopropyl ether, benzoin isobutyl ethers and methylbenzoin, diketones such as benzil and diacetyl, phenones such as acetophenone, 2,2,2-tri-bromo-1-phenylethanone, 2,2-diethoxyacetophenone, 2,2-dimethoxy-2-phenylacetophenone, 2,2,2,-tribromo-1(2-nitrophenyl) ethanone, benzophenone, 4,4-bis(dimethyamino) benzophenone, and acyl phosphates. Examples of commercially available ultraviolet photoinitiators include those available under the trade designations "IRGACURE™ 184" (1-hydroxycyclohexyl phenyl ketone), "IRGACURE™ 361" and "DAROCUR™ 1173" (2-hydroxy-2-methyl-1-phenyl-propan-1-one) from Ciba-Geigy. Typically, if used, an amount of an initiator is included in the ceramer composition to effect the desired level and rate of cure. Preferably, the initiator is used in an amount of about 0.1 to about 10%, and more preferably about 2 to about 4% by weight, based on the total weight of the ceramer composition without solvent. It should be understood that combinations of different initiators can be used if desired.

In addition to the initiator, the ceramer composition of the present invention can include a photosensitizer. The photosensitizer aids in the formation of free radicals that initiate curing of the curable binder precursors, especially in an air atmosphere. Suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, xanthone, thioxanthone, 9,10-anthraquinone, and many other aromatic ketones. Suitable tertiary amines include, but are not limited to, methyldiethanolamine, ethyldiethanolamine, triethanolamine, phenylmethyl-ethanolamine, dimethylaminoethylbenzoate, and the like. Typically, if used, an amount of photosensitizer is included in the ceramer compositions to effect the desired level and rate of cure. Preferably, the amount of photosensitizer used in the ceramer compositions of the present invention is about 0.01 to about 10%, more preferably about 0.05 to about 5%, and most preferably about 0.25 to about 3% by weight, based on the total weight of the ceramer composition without solvent. It should be understood that combinations of different photosensitizers can be used if desired.

Polymeric materials are known to degrade by a variety of mechanisms. Common additives that can offset this are known as stabilizers, absorbers, antioxidants, and the like. The ceramer compositions of the present invention can include one or more of the following: ultraviolet stabilizer, ultraviolet absorber, ozone stabilizer, and thermal stabilizer/antioxidant.

An ultraviolet stabilizer or ultraviolet absorber improves weatherability and reduces the "yellowing" of the abrasion resistant, ceramer coating with time. An example of an ultraviolet stabilizer includes that available under the trade designation "TINUVIN™ 292" (bis(1,2,2,6,6-pentamethyl-4-piperidinyl)sebacate) and an example of an ultraviolet absorber includes that available under the trade designation "TINUVIN™ 1130" (hydroxyphenyl benzotriazole), both of which are available from Ciba-Geigy. The ceramer composition can include an amount of either an ultraviolet stabilizer or an ultraviolet absorber to impart the desired result. Preferably, the ultraviolet stabilizer or absorber is present in an amount up to about 10% by weight, and more preferably about 1 to about 5%, based on the total weight of the ceramer composition without solvent. It should be understood that combinations of different ultraviolet stabilizers and absorbers can be used if desired.

An ozone stabilizer protects against degradation resulting from reaction with ozone. Examples of ozone stabilizers include, but are not limited to, hindered amines such as that available under the trade designation "IRGANOX™ 1010" available from Ciba-Geigy and phenoltriazine commercially available from Aldrich. The ceramer composition can include an amount of an ozone stabilizer to impart the desired result. Preferably, the ozone stabilizer is present in an amount up to about 1% by weight, more preferably about 0.1 to about 1.0%, and most preferably about 0.3 to about 0.5%, based on the total weight of the ceramer composition without solvent. It should be understood that combinations of different ozone stabilizers can be used if desired.

A thermal stabilizer/antioxidant reduces the amount of yellowing as a result of weathering. Examples of such materials include, but are not limited to, low melting hindered phenols and triesters. Specific examples include 2,6-di-tert-butyl-4-methylphenol commercially available under the trade designation "ULTRANOX™ 226" antioxidant from Borg Warner Chemicals, Inc., Parkersburg, N.Y.; octadecyl 3,5-di-tert-butyl-4-hydroxycinnamate commercially available under the trade designations "ISONOX™ 132" antioxidant (Schenectady Chemicals, Inc., Schenectady, N.Y.) or "VANOX™ 1320" antioxidant (Vanderbilt Co., Inc., Norwalk, Conn.). The ceramer composition can include sufficient thermal stabilizer/antioxidant to impart the desired result. Preferably, the thermal stabilizer/antioxidant is present in an amount up to about 3% by weight, and more preferably about 0.5 to about 1%, based on the total weight of the ceramer composition without solvent. It should be understood that combinations of different thermal stabilizers/antioxidants can be used if desired.

According to one approach, a ceramer composition of the present invention is prepared by combining ingredients including a fluoro/silane component, a crosslinkable silane component, a curable binder precursor, and a colloidal inorganic oxide. The fluoro/silane component may be combined with a first admixture containing a colloidal inorganic oxide and a curable binder precursor in the presence of a crosslinkable silane component. The fluoro/silane component may be premixed with the crosslinkable silane component to form a second admixture, which second admixture is then combined with the first admixture to form a third admixture, namely the ceramer composition. The crosslinkable silane component may also be premixed with the first admixture to provide a fourth admixture which can then be combined with the fluoro/silane component to form the ceramer composition.

The fluoro/silane component, first admixture and crosslinkable silane component are combined under conditions such that at least a portion of the colloidal inorganic oxides is surface treated by the fluoro/silane component. Preferably, once so combined, the hydrolyzable silane moieties of the fluoro/silane component and the crosslinkable silane component are allowed to react with and thereby functionalize (surface treat) the colloidal inorganic oxides with pendant $R_c$ and $R_f$ functionality. By incorporating the fluoro/silane component into the ceramer composition in this manner, the resultant ceramer composition remains optically clear and, therefore, is especially useful for forming optically clear ceramer coatings.

The ceramer composition is then stripped, e.g., heated under vacuum to remove substantially all of the water. For example, removing about 98% of the water, thus leaving about 2% water in the ceramer composition, has been found to be suitable. When the curable binder precursor contains free-radically-curable prepolymers, the resultant dried ceramer composition is a clear liquid. As soon as substantially all of the water is removed, an organic solvent of the type described above is added, if desired, in an amount such that the ceramer composition preferably includes from about 5% to about 95% by weight solids, more preferably from about 10% to about 50% by weight solids and most preferably from about 15% to about 30% by weight solids.

The resultant ceramer composition is then coated onto any substrate for which it is desired to improve one or more of abrasion resistance, impact resistance or stain resistance. Examples of such substrates include any and all thermosetting or thermoplastic items such as camera lenses, eyeglass lenses, binocular lenses, automobile windows and body panels as an automotive topcoat, building windows, bakeware, train windows, boat windows, aircraft windows, vehicle headlamps and taillights, display cases, eyeglasses, watercraft hulls, overhead projectors, stereo cabinet doors, stereo covers, furniture, bus station plastic, television screens, computer screens, watch covers, instrument gauge covers, optical and magneto optical recording disks, graphic displays, and the like. Adhesion of the ceramer coating to the substrate may vary depending on the particular substrate and on other factors such as whether the substrate is primed, oriented during manufacture (unoriented or oriented axially or biaxially) or otherwise modified.

The ceramer compositions of the present invention may also be applied to animal skin products such as leather, and to synthetic leather products to protect such products from stains, abrasion, scuffing, cracking, and wear. Typically, the ceramer composition is applied to these products using spray, brush, roll, or transfer coating methods.

Any suitable coating technique can be used for applying the ceramer composition to the substrate, depending upon the nature of the substrate, the viscosity of the ceramer composition, and the like. Examples of suitable coating techniques include spin coating, gravure coating, flow coating, spray coating, coating with a brush or roller, screen printing, knife coating, curtain coating, slide curtain coating, extrusion, squeegee coating, and the like. Typical protective ceramer coatings of the present invention have a thickness in the range from about 1 micron to about 100 microns, preferably about 2 to about 50 microns, more preferably about 4 to about 9 microns. Generally, ceramer coatings that are too thin may not have sufficient abrasion or impact resistance, and tend to run, thereby causing a waste of material. Ceramer films that are too thick may have a greater tendency to crack.

After coating, the solvent can be flashed off with heat or allowed to evaporate under ambient conditions. If radiation curable, the coated ceramer composition is then cured by irradiation with a suitable form of energy, such as visible light, ultraviolet light or electron beam radiation. Irradiating with ultraviolet light in ambient conditions is presently preferred due to the relative low cost and speed of this curing technique. Irradiation causes the curable binder precursor and the surface treated, colloidal inorganic oxides to crosslink together to form a ceramer coating containing a polymer matrix having the colloidal inorganic oxides, and any optional additives, interspersed in the polymer matrix. The resultant ceramer-coated substrate is thereby protected against stains, abrasion, and impact.

The present invention will now be further described with reference to the following examples.

EXAMPLES

Test Methods

Test Procedure I: Taber Abrasion Test on Plastic

This test measures the Taber abrasion of the ceramer composition when coated on a substrate and was performed according to ASTM D1044 (Standard Method for Resistance of Transparent Plastics to Surface Abrasion), the disclosure of which is incorporated herein by reference. Briefly, the test method involved abrading a sample on a TABER ABRASER™ tester for 100, 300 and 500 cycles using a 500 gram load with a CS-10F wheel at room temperature. After each cycle of exposure to the abrasive wheels the percent change in haze was measured.

Test Procedure II: Warm Water Adhesion Test

This test was designed to test the ceramer composition's durability when coated on a substrate and submersed in water at elevated temperatures. The sample was completely submerged in water at the stated temperature for the stated time period. Specifically, the samples were submerged in water baths at about 60° C. for 11 and 13 days, at about 71° C. for 6 and 8 days and at about 82° C. for 3 and 5 days. At the end of the stated time period, the samples were removed, examined for any delamination and subjected to a Cross Hatch Adhesion Test (Test Procedure IV described below) and to a Tape Snap Test (Test Procedure V described below).

Test Procedure III: Weatherability

This test assesses the ability of the ceramer composition, when coated on a substrate, to withstand weathering conditions (e.g., sunlight). The test was conducted according to ASTM Test Standard G-26-88, Type B, BH (Standard Practice for Operating Light Exposure Apparatus (Xenon-Arc Type) with and without Water for Exposure of Nonmetallic Materials), the disclosure of which is incorporated by reference herein.

Briefly, a sample was exposed to a 6500 Joule/second xenon burner filter through borosilicate inner and outer filters at $0.35 W/m^2$ in a Water Cooled Xenon Arc Model 65XWWR Weathering Chamber, available from Atlas Electric Devices Co. (Chicago, Ill.) for repetitive cycles of 102 minutes at about 63° C. followed by 18 minutes with a water spray. To provide a ceramer coating passing this test for a particular substrate, the ceramer coating must be capable of withstanding at least 1000 hours of exposure under these conditions with no significant yellowing, whitening, or other discoloration.

Undesirable results obtained from this weathering test include, in particular, whitening, delamination, and "checks", which are imperfections in the form of slight inclusions in the coating.

Test Procedure IV: Cross Hatch Adhesion Test

The test method assesses the adhesion of coating films to substrates by applying and removing pressure-sensitive adhesive tape over cuts made in a film of the coating composition. A crosshatch pattern with 3 cuts in each direction was made in the coating on the substrate. Then a pressure-sensitive adhesive tape was applied over the crosshatch and removed. Adhesion was evaluated by comparing descriptions and illustrations. The cutting tool was a sharp razor blade, scalpel, knife or other cutting device which had a cutting edge in good condition. A cutting guide was used to ensure straight cuts. The tape was 1 inch (25 mm) wide semi transparent pressure-sensitive adhesive tape with an adhesion strength of 36 plus or minus 2.5 oz/in. (40 plus or minus 2.8 g/mm) when tested in accordance with ASTM Test Method B 1000 incorporated by reference herein in its entirety.

An area free of blemishes and minor surface imperfections on the coating was selected. Care was taken to ensure that the surface was clean and dry. Extremes in temperature or relative humidity which may affect the adhesion of the tape or the coating were avoided. Two sets of three parallel 20 mm long cuts were made in the coating, with one set oriented at 90° to cuts in the other set and the sets intersecting near the middle of the test panel. The cuts were made in one steady motion to penetrate through the coating to the substrate, leaving the substrate visible through the coating. After cutting, the film was lightly brushed to remove detached flakes or ribbons of coatings. A piece of tape 75 mm long was removed from the roll and placed with the center of tape at the intersection of the cuts with the tape running in the same direction as one set of the cuts. The tape was smoothed in place with finger in the area of the cuts and then rubbed firmly with an eraser on the end of a pencil. Within 90 seconds (plus or minus 30 seconds) of application, the tape was removed by creasing a free end and pulling it off rapidly at about 180°, without jerking the tape back upon itself. The cut area was then inspected for removal of coating from the substrate and rated for adhesion according to the following scale: A coating was designated "pass" if:

the edges of the cuts are completely smooth; none of the squares of the lattice is detached; or small flakes of the coating are detached at intersections; (less than 5% of the area is affected); or small flakes of the coating are detached along edges and at intersections of cuts; (the area affected is 5 to 15% of the lattice).

The coating was designated "fail" if:

the coating has flaked along the edges and on parts of the squares; (the area affected is 15 to 35% of the lattice); or the coating has flaked along the edges of cuts in large ribbons and whole squares have detached; (the area affected is 35 to 65% of the lattice).

Test Procedure V: Tape Snap Test

A section of adhesive tape was affixed to the surface of the coating with the end of the tape overlapping the edge of the sheet. The tape was then "snapped" off by pulling it rapidly at 90° to the surface of the coating, and the coating visually inspected for evidence of delamination. A coating was designated "pass" if minor or no evidence of delamination was found.

Test Procedure VI: Taber Abrasion Test on Leather

This test measures the Taber abrasion of the ceramer composition when coated on a leather substrate and was performed according to ASTM D3884, the disclosure of which is incorporated herein by reference. This test method measures the abrasion resistance of the surface coating on leather and synthetic leathers using a rotary rubbing action under controlled pressure. The Taber abrasion machine used was Model number 5130 available from Taber Industries, Tonawanda, N.Y. The samples were cut to about 103±3 millimeters with a 7±1 millimeter hole punched in the center of the test sample. The samples were attached to the Taber disc with S-36 cardboard backer (available from Taber Industries). The testing was conducted using conditioned H-22 abrasive wheels with 1000 gram weights. A sample failed when a wear area of about 2 millimeters depth was observed.

Example 1

56.2 Parts by weight of the curable binder precursor PETA (pentaerythritol triacrylate) was heated to about 49° C. in a one liter flask. 35.2 Parts by weight silica (88 parts of 40% solids, 20 nanometers average particle size, commercially available from Nalco Corp., Naperville, Ill., under the trade designation "Nalco 2327") were added to the PETA to form a first admixture. In a separate flask, 7.7 parts by weight of the crosslinkable silane component 3-methacryloxypropyl-trimethoxysilane, (commercially available from Union Carbide under the trade designation "A-174") were mixed with 0.8 parts by weight of fluoro/silane component of Formula (11) (commercially available from Minnesota Mining and Manufacturing Company, St. Paul, Minn. under the trade designation "FC-405") to form a second admixture. The first and second admixtures were then mixed together to form a third admixture. In a weighing tray, 0.15 parts by weight BHT (butylated hydroxytoluene) and 0.02 parts by weight phenothiazine (both based on the 56.2 parts by weight PETA) were mixed together and then added to the third admixture to form a fourth admixture.

The fourth admixture was then "stripped" by subjecting it to a gentle vacuum distillation (100±20 mm Hg) at 52°±2° C. until most of the water/methanol was removed. A residual amount (a few weight-percent) of water remained in the dried product. At the end of the stripping process, the admixture was diluted to 50% solids with a 14:1 weight-ratio solvent of isopropyl alcohol:distilled water. This 50% solids admixture was further diluted to 25% solids with the same solvent mixture. About 0.7 parts by weight photoinitiator (commercially available from Ciba Geigy Corp., Hawthorne, N.Y., under the trade designation "IRGACURE 184") was also added.

The ceramer composition was then coated onto PMMA (polymethylmethacrylate) and polycarbonate substrates at a thickness of about 4 to about 5 micrometers using conventional flow coating techniques. Each coated substrate was then flash dried at about 60° C. for 2.5 minutes in an air circulating oven to ensure that the majority of the isopropanol was driven off. Finally, the coating was cured on a conveyor belt of a UV light processor using a high pressure mercury lamp (Model QC 1202, available from PPG Industries, Plainfield, Ill.). The process conditions were 16.5 meters/minute, 410 volts, energy 90 mJ/cm$^2$, and an air atmosphere.

The resulting ceramer coatings were perfectly clear and adhered to the PMMA and polycarbonate substrates. Furthermore, the coatings passed Test Procedures I, II and III and had excellent shelf stability. After 6 months, sols prepared in accordance with the above procedure were clear, with no apparent flocculation.

Example 2

Example 2 was carried out as in Example 1 except that the crosslinkable silane component was added to the first admixture of PETA and silica, followed by addition of the fluoro/silane component. These steps were performed by heating 56.2 parts by weight of PETA to about 49° C. in a one liter flask. 35.2 Parts by weight silica (88 parts by weight of 40% solids NALCO™ 2327) was added to the flask. 7.7 Parts by weight of 3-methacryloxypropyl-trimethoxysilane were then added to the flask, followed by addition of 0.8 parts by weight of a fluoro/silane component of Formula (11). In a weighing tray, 0.15 part by weight BHT and 0.02 parts by weight phenothiazine (both based on the 56.2 parts by weight PETA) were mixed together and then added to the flask. The resulting admixture was then stripped, diluted with solvent, coated onto PMMA and polycarbonate substrates and cured as in Example 1. The resulting ceramer coatings were perfectly clear and adhered to the PMMA and polycarbonate substrates. Furthermore, the resulting ceramer coatings passed Test Procedures I, II and III.

Example 3

Example 3 was carried out as in Example 1 except that the fluoro/silane component was first added individually to the first admixture of PETA and silica, followed by addition of the crosslinkable silane component. These steps were performed by heating 56.2 parts by weight of PETA to about 49° C. in a one liter flask. 35.2 Parts by weight silica (88 parts by weight of 40% solids NALCO 2327) were added to the flask. 0.8 Parts by weight of the fluoro/silane component were then added to the flask, followed by addition of 7.7 parts by weight of 3-methacryloxypropyl-trimethoxysilane. In a weighing tray, 0.15 parts by weight BHT and 0.02 parts by weight phenothiazine (both based on the 56.2 parts by weight PETA) were mixed together and then added to the flask. The final mixture precipitated. Thus, the composition was not coatable and the experiment was not completed.

Example 4

Example 4 was carried out as in Example 1 except that 15.6 parts by weight (based on 56.2 parts by weight PETA) of dimethylacrylamide (DMA) was added to the third admixture of Example 1 before addition of the mixture of BHT and phenothiazine. The resulting admixture was then stripped, diluted with solvent, coated onto PMMA and polycarbonate substrates and cured as in Example 1. The resulting ceramer coatings were perfectly clear and adhered to the PMMA and polycarbonate substrates. Furthermore, the resulting ceramer coatings passed Test Procedures I, II and III and performed as well as the coatings of Example 1. This example thus shows that DMA may be used in the ceramer compositions of the present invention, if desired, but is not required.

Example 5

Example 5 was prepared as described in Example 1, except a silica/alumina mixture was substituted for the silica. Thus, 56.2 parts by weight of PETA were preheated to about 49° C. and then combined with 35.3 parts by weight of silica (88 parts by weight of 40% solids NALCO™ 2327, 20 nm) and 1 part by weight sodium aluminate ($NaAlO_2$) to form a first admixture. A second admixture of 7.8 parts by weight of A-174 and 0.8 parts by weight of the compound of Formula (11) was prepared and added to the first admixture with stirring to form a third admixture. In a weighing tray, 0.15 parts by weight BHT and 0.02 parts by weight phenothiazine (both based on the 56.2 parts by weight PETA) were mixed together and then added to the third admixture to form a fourth admixture.

The fourth admixture was then stripped, diluted with solvent, coated onto PMMA and polycarbonate substrates and cured as in Example 1.

Example 6

Example 6 was carried out as described in Example 5, except dimethylacrylamide was added to the other ingredients in the second admixture. The second admixture contained about 0.7 parts by weight of A-174, 0.8 parts by weight of the compound of Formula (11) and 8.0 parts by weight of dimethylacrylamide. The ceramer composition was stripped, diluted with solvent, coated onto PMMA and polycarbonate substrates and cured as in Example 1.

Comparative Example A

This ceramer composition contained dimethylacrylamide (DMA) as a component of the binder precursor, but no fluoro/silane component. Specifically, 51.5 parts by weight of PETA were heated to about 49° C. 32.4 Parts by weight silica (88 parts by weight of 40% solids NALCO 2327) were added to the PETA to form a first admixture. In a separate flask, 8.1 parts by weight of 3-methacryloxypropyl-trimethoxysilane were mixed with 8.0 parts by weight DMA to form a DMA-altered second admixture. The first admixture was mixed with the DMA-altered second admixture to form a third admixture. In a weighing tray, 0.15 parts by weight BHT and 0.02 parts by weight phenothiazine (both based on the 51.5 parts by weight PETA) were mixed together and then added to the third admixture to form a fourth admixture.

The fourth admixture was then stripped, diluted with solvent, coated onto PMMA and polycarbonate substrates and cured as in Example 1. Like the ceramer coating of Example 1, the ceramer coatings of this comparative example were perfectly clear, adhered to the PMMA and polycarbonate substrates, and passed Test Procedures I, II and III. Thus in these tested respects, a composition of the invention performed comparably to a ceramer made using DMA but no fluoro/silane component.

Comparative Example B

Comparative Example B was prepared as described in Example 2 except that no fluoro/silane component was added. 56.2 Parts by weight of PETA were heated to about 49° C. (120° F.) in a one liter flask. 35.2 Parts by weight silica (88 parts by weight of 40% solids NALCO 2327) were added to the PETA to form a first admixture. 7.7 Parts by weight of 3-methacryloxypropyl-trimethoxysilane were then added to the flask, followed by the addition of 15.6 parts by weight DMA (based on 56.2 parts by weight PETA). In a weighing tray, 0.15 parts by weight BHT and 0.02 parts by weight phenothiazine (both based on the 56.2 parts by weight PETA) were mixed together and then added to the flask.

The resulting admixture was then stripped, diluted with solvent, coated onto PMMA and polycarbonate substrates and cured as in Example 2. Like the ceramer coating of Example 2, the ceramer coatings of this comparative example were perfectly clear, adhered to the PMMA and polycarbonate substrates, and passed Test Procedures I, II and III. Thus in these tested respects, a composition of the invention performed comparably to a ceramer made using DMA but no fluoro/silane component.

Comparative Example C

Comparative Example C was a hardcoating prepared using commercially available coating material from Cyro Corp., Rockaway, N.J., under the trade designation "CYRO AR".

Comparative Example D

A mixture was prepared as described in Comparative Examples A and B, omitting DMA. The resulting mixture coagulated on stripping.

Summary of Results

The ceramer coatings described above were evaluated using a variety of test methods. As is illustrated in the following Tables 3 through 10 and in Examples 1–2 and 4, a nonionic fluorochemical containing both a fluorinated moiety and a silane moiety (the fluoro/silane component) can be successfully incorporated into a ceramer sol, without causing colloid flocculation. Ceramer coatings containing such a fluoro/silane component, whether prepared with or without DMA, have surprisingly long shelf lives and excellent stain resistant characteristics (See Examples 1 and 4). Additionally, ceramer compositions of the present invention can be used to prepare ceramer coatings that exhibit a high level of abrasion resistance, durability and hardness (See Tables 3–10). Some of the coatings shown in Tables 3–10 employed additives whose formulations are set out in Table 1 and whose ingredients are further identified in Table 2. The amounts of such additives are expressed based on the weight of ceramer solids.

TABLE 1

| Additive | Components |
| --- | --- |
| I | 0.9 parts by weight "TINUVIN[1] 123" |
| | 1.6 parts by weight "SANDUVOR[2] 3058" |
| | 2.8 parts by weight "TINUVIN 1130" |
| | 2.8 parts by weight "TINUVIN 400" |
| II | "TINUVIN 292" |
| III | 2 parts by weight "TINUVIN 292" |
| | 2 parts by weight "TINUVIN 384" |
| IV | 1.2 parts by weight "TINUVIN 123" |
| | 0.7 parts by weight "SANDUVOR 3058" |
| | 2.07 parts by weight "TINUVIN 384" |
| | 2.07 parts by weight "TINUVIN 400" |

[1]TINUVIN, all grades, is commercially available from Ciba-Geigy Corporation, Hawthorne, NY
[2]SANDUVOR, all grades, is commercially available from Clariant Corp, Charlotte, NC

TABLE 2

| Trade Name | Chemical Name |
|---|---|
| TINUVIN 123 | bis-(1-octyloxy-2,2,6,6,tetramethyl-4-piperidinyl) sebacate |
| SANDUVOR 3058 | N-acrylated HALs compound |
| TINUVIN 400 | 1,3-benzenediol,4-[4,6-bis(2,4-dimethyl)-1,3,5-triazin-2-yl] |
| CG TINUVIN 292 | bis-(1,2,2,6,6-pentamethyl-4-piperidinyl) sebacate |
| CG TINUVIN 1130 | hydroxyphenyl benzotriazole |
| TINUVIN 384 | 3-(2H-benzotriazol-2-YL)-5-(tert-butyl)-4-hydroxybenzenepropanoic acid |

TABLE 3

Taber Abrasion Test - Coated on PMMA
% HAZE

| Sample | 100 cycles | 300 cycles | 500 cycles |
|---|---|---|---|
| Comp. A* | 2.6 | 3.1 | 4.1 |
| Example 4* | 2.0 | 3.0 | 3.6 |
| Comp. B | 1.4 | 3.0 | 3.9 |
| Example 1 | 1.3 | 3.1 | 3.9 |
| Example 4 | 0.9 | 2.4 | 3.2 |
| Comp. A** | 1.9 | 3.6 | 4.2 |
| Comp. B** | 1.5 | 2.8 | 3.7 |
| Example 1** | 1.6 | 3.3 | 4.1 |
| Example 4** | 1.3 | 2.9 | 3.5 |

Samples denoted with "*" included 4 wt-% of additive III on ceramer weight basis.
Samples denoted with "**" included 2 wt-% of additive II.

TABLE 4

Taber Abrasion Test - Coated on Polycarbonate
% HAZE

| Sample | 100 cycles | 300 cycles | 500 cycles |
|---|---|---|---|
| Example 1 | 1.7 | 3.3 | 4.1 |
| Example 4 | 1.3 | 2.8 | 3.5 |
| Comp. A* | 3.1 | 3.2 | 3.8 |
| Example 4* | 2.8 | 2.7 | 3.1 |
| Comp. B | 1.3 | 2.3 | 3.2 |
| Example 1 | 1.0 | 2.5 | 3.2 |
| Example 4 | 1.0 | 2.3 | 3.1 |
| Comp. A** | 2.5 | 2.9 | 4.4 |
| Comp. B** | 3.0 | 2.5 | 3.5 |
| Example 1** | 3.0 | 2.6 | 3.3 |
| Example 4** | 2.7 | 2.2 | 3.1 |
| Comp. C | 2.5 | 3.0 | 3.8 |

Samples denoted with "*" included 6 wt-% of additive IV on a ceramer weight basis.
Samples denoted with "**" included 8 wt-% of additive I.

TABLE 5

Warm Water Adhesion Test - Coated on PMMA

| Sample | 11 days @ 60° C. | 8 days @ 71° C. | 3 days @ 82° C. |
|---|---|---|---|
| Example 1 | pass | Pass | pass |
| Example 4 | pass | Pass | pass |
| Comp. A* | pass | Pass | pass |
| Example 4* | pass | Pass | pass |

Samples denoted with "*" included 4 wt-% of additive III of a ceramer weight basis.

TABLE 6

Warm Water Adhesion Test - Coated on PMMA

| Sample | 13 days @ 60° C. | 6 days @ 71° C. | 5 days @ 82° C. |
|---|---|---|---|
| Comp. B | pass | pass | pass |
| Example 1 | pass | pass | pass |
| Example 4 | pass | pass | pass |
| Comp. A* | pass | pass | pass |
| Comp. B* | pass | pass | pass |
| Example 1* | pass | pass | pass |
| Example 4* | pass | pass | pass |
| Comp. C | pass | pass | pass |

Samples denoted with "*" included 2 wt-% of additive II on a ceramer weight basis.

TABLE 7

Warm Water Adhesion Test - Coated on Polycarbonate

| Sample | 11 days @ 60° C. | 8 days @ 71° C. | 3 days @ 82° C. |
|---|---|---|---|
| Comp. A | pass | pass | pass |
| Example 1 | pass | pass | pass |
| Example 4 | pass | pass | pass |
| Comp. A* | pass | pass | pass |
| Example 4* | pass | pass | pass |

Samples denoted with "*" included 6 wt-% of additive IV on a ceramer weight basis.

TABLE 8

Warm Water Adhesion Test - Coated on Polycarbonate

| Sample | 13 days @ 60° C. | 6 days @ 71° C. | 5 days @ 82° C. |
|---|---|---|---|
| Comp. A | pass | pass | pass |
| Comp. B | pass | pass | pass |
| Example 1 | pass | pass | pass |
| Example 4 | pass | pass | pass |
| Comp. A* | pass | pass | delaminated |
| Comp. B* | pass | pass | delaminated |
| Example 1* | pass | pass | delaminated |
| Example 4* | pass | pass | delaminated |
| Comp. C | pass | pass | pass |

Samples denoted with "*" included 8 wt-% of additive I on a ceramer weight basis.

TABLE 9

Weathering Test - Coated on PMMA

| Sample | Hours |
|---|---|
| Example 1 | 1400 - few small checks |
| Example 4 | 1400 - few small checks |
| Comp. A | 1400+ |
| Example 1* | 3700 - few long checks |
| Example 4* | not done |
| Comp. A* | 3515+ |
| Example 1 | 1800 - checks, slight whitening |
| Example 4 | 1800 - checks, slight whitening |
| Comp. B | 1800 - checks, slight whitening |
| Example 1** | 2425+ |
| Example 4** | 2525+ |
| Comp. A** | 3515+ |
| Comp. B** | 2425+ |

+denotes that the test is on going
Samples denoted with "*" included 4 wt-% of additive III.
Samples denoted with "**" included 2 wt-% of additive II.

TABLE 10

Weathering Test - Coated on Polycarbonate

| Sample | Hours |
|---|---|
| Example 1 | 1000 - 20% delamination |
| Example 4 | 1000 - total delamination |
| Comp. A | ~800 |
| Example 1* | 2400 - slight delamination |
| Example 4* | not done |
| Comp. A* | 2200 |
| Example 1 | ~750 |
| Example 4 | ~750 |
| Comp. A | ~800 |
| Comp. B | ~900 |
| Example 1** | 2425 - slight delamination & very small checks |
| Example 4** | 2425 - slight delamination & very small checks |
| Comp. A** | ~2500 |
| Comp. B** | 2425 - slight delamination |

Samples denoted with "*" included 6 wt-% of additive IV.
Samples denoted with "**" included 8 wt-% of additive I.

In the following Examples, coating formulations were prepared as in Example 1 using various inorganic oxides. The coating compositions were coated onto either acrylic (Cyro-FF™, available from Cyro Inc.) or polycarbonate (Cyro-ZX™, available from Cyro Inc.) substrates and cured as previously described. The cured coatings were then subjected to the Taber Abrasion Test on Plastic. As a comparative test, acrylic and polycarbonate sheets coated with a proprietary abrasion-resistant coating (Cyro-AR[1] m, available from Cyro Inc.) were also tested. The inorganic oxides used and the results of the abrasion tests are shown in Tables 11 and 12.

TABLE 11

% HAZE on Acrylic

| Sample | Inorganic Oxide | 100 cycles | 300 cycles | 500 cycles |
|---|---|---|---|---|
| Comp. E | Cyro-AR | 2.2 | 4.3 | 5.7 |
| Example 7 | $SiO_2/NaAlO_2$ 99:1 | 1.3 | 3.2 | 4.2 |
| Example 8 | $SiO_2/NaAlO_2$ 98:2 | 1.0 | 2.5 | 3.4 |
| Example 9 | $SiO_2/ZrO_2$ 95:5 | 2.3 | 4.6 | 7.6 |
| Example 10 | $SiO_2/ZrO_2$ 90:10 | 3.2 | 6.5 | 9.5 |
| Example 11 | $SiO_2/SnO_2$ 95:5 | 1.2 | 3.2 | 4.2 |

TABLE 12

% HAZE on Polycarbonate

| Sample | Inorganic Oxide | 100 cycles | 300 cycles | 500 cycles |
|---|---|---|---|---|
| Comp. F | Cyro-AR | 2.2 | 2.9 | 3.5 |
| Example 12 | $SiO_2/NAlO_2$ 99:1 | 1.0 | 2.4 | 3.4 |
| Example 13 | $SiO_2/NaAlO_2$ 98:2 | 0.6 | 1.7 | 2.5 |
| Example 14 | $SiO_2/ZrO_2$ 95:5 | 1.8 | 3.6 | 5.2 |
| Example 15 | $SiO_2/ZrO_2$ 90:10 | 2.1 | 4.8 | 7.1 |
| Example 16 | $SiO_2/SnO_2$ 95:5 | 0.7 | 2.0 | 3.0 |

As can be seen from the data, all the samples provide good abrasion resistance on both acrylic and polycarbonate substrates. In particular, the coatings containing $NaAlO_2$ or mixed oxides of $SiO_2$ and $SnO_2$ provide improved abrasion resistance relative to commercially available coatings.

Examples 17 to 26

In the following Examples, coating formulations were prepared as in Example 1 using various inorganic oxides. The coating compositions were coated onto either acrylic (Cyro-ACRYLITE™, available from Cyro Inc.) or polycarbonate substrates (Cyro-CYROLON™, available from Cyro Inc.) and cured as previously described. The cured coatings were then subjected to the Warm Water Adhesion Test. The results are set out below in Tables 13 and 14.

TABLE 13

Warm Water Adhesion Test on Acrylic

| Sample | Inorganic oxide | 10 days @ 57° C. | 5 days @ 68° C. | 5 days @ 78° C. | Cross Hatch test |
|---|---|---|---|---|---|
| Example 17 | $SiO_2/NaAlO_2$ 99:1 | pass | pass | pass | pass |
| Example 18 | $SiO_2/NaAlO_2$ 98:2 | pass | pass | pass | pass |
| Example 19 | $SiO_2/ZrO_2$ 95:5 | pass | pass | pass | pass |
| Example 20 | $SiO_2/ZrO_2$ 90:10 | pass | pass | pass | pass |
| Example 21 | $SiO_2/SnO_2$ 95:5 | pass | pass | pass | pass |

TABLE 14

Warm Water Adhesion Test on Polycarbonate

| Sample | Inorganic oxide | 10 days @ 57° C. | 5 days @ 68° C. | 5 days @ 78° C. | Cross Hatch test |
|---|---|---|---|---|---|
| Example 22 | SiO$_2$/NaAlO$_2$ 99:1 | pass | pass | pass | pass |
| Example 23 | SiO$_2$/NaAlO$_2$ 98:2 | pass | pass | pass | pass |
| Example 24 | SiO$_2$/ZrO$_2$ 95:5 | pass | pass | pass | pass |
| Example 25 | SiO$_2$/ZrO$_2$ 90:10 | pass | pass | pass | pass |
| Example 26 | SiO$_2$/SnO$_2$ 95:5 | pass | pass | pass | pass |

Examples 27 to 30

In the following Examples the effect of the fluorochemical on graffiti resistance was evaluated. Several compositions were coated onto either acrylic or polycarbonate substrates and cured as previously described. In the first of two tests the coated substrate was written upon with a SHARPIE™ marker and the ink was allowed to dry. Then removal of the ink was attempted by rubbing with a paper tissue. If all of the ink was removed, the coating was acceptable and rated as "pass".

In the second test, Rust-Oleum™ spray paint was applied to the coated substrate. The spray can was held about 20 to 25 from the sample and a one-second burst was applied to form a spot of paint. Next the spray can was held the same distance from the sample and a line of paint was applied with a three-second burst. Then the paint was allowed to dry and removal of the paint was attempted by rubbing with a paper tissue. If all of the paint was removed, the coating was rated as a "pass". The coating composition of Comparative Example A was similarly evaluated.

TABLE 15

| Sample | Coating Composition | Substrate | Ink | Paint |
|---|---|---|---|---|
| Example 27 | Example 1 | Polycarbonate | pass | pass |
| Example 28 | Example 4 | Polycarbonate | pass | pass |
| Comp. E | Comp. A | Polycarbonate | fail | fail |
| Example 29 | Example 1 | Acrylic | pass | pass |
| Example 30 | Example 4 | Acrylic | pass | pass |
| Comp. F | Comp. A | Acrylic | fail | fail |

The above results show that coating compositions of the present invention benefit from the incorporation of a fluorochemical and are useful as anti-graffiti coatings. In contrast, coating lacking the fluorochemical remained soiled by ink and paint.

Example 31

Two white full grain leathers (available from Sadesa, Buenos Aires, Argentina) designated #2040 and #2059 were spray coated with the ceramer composition of Example 1, using a commercial sprayer and holding the leather sample in a horizontal position. The coating weight was 11 grams/meters$^2$. The samples were then oven dried for about 10 minutes at 70° C. The samples were then cured using a UV chamber with mercury vapor lamps (power setting–300 Joules/seconds/meters$^2$) at a speed of 6 meters/minute.

The samples were tested according to the Taber Abrasion Test on Leather. The results are set out below in Table 16.

TABLE 16

| Sample | Uncoated | Coated with Ceramer |
|---|---|---|
| #2040 | 75 cycles | 225 cycles |
| #2059 | 125 cycles | 600 cycles |

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

We claim:

1. A method of making a curable ceramer composition, comprising the step of combining a fluoro/silane component with an admixture comprising colloidal inorganic oxide and curable binder precursor, said combining step occurring in the presence of a crosslinkable silane component; wherein the fluoro/silane component comprises a hydrolyzable silane moiety and a fluorinated moiety, the crosslinkable silane component comprises a hydrolyzable silane moiety and a polymerizable moiety other than a silane moiety, and the curable binder precursor comprises a polymerizable moiety copolymerizable with the polymerizable moiety of the crosslinkable silane component; said combining step further occurring under conditions such that at least a portion of the colloidal inorganic oxide is surface treated by the fluoro/silane component.

2. The method of claim 1, wherein the admixture comprises a sol of colloidal inorganic oxides.

3. The method of claim 2, further comprising the step of stripping the composition to remove water.

4. The method of claim 3, further comprising the step of adding an organic solvent to the stripped composition to form a coatable composition containing from about 5% to about 95% solids by weight.

5. The method of claim 1, wherein the weight ratio of the crosslinkable silane to the fluoro/silane is between 4:1 and 20:1.

6. The method of claim 1, wherein the crosslinkable silane component is represented by the formula:

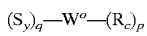

$(S_y)_q—W^o—(R_c)_p$ wherein $S_y$ represents a hydrolyzable silane moiety; $R_c$ is a moiety comprising free-radically polymerizable functionality; q is at least 1; p is at least 1; and $W^o$ is a linking group having a valency of q+p.

7. The method of claim 1, wherein the fluoro/silane component is represented by the formula:

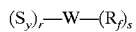

wherein $S_y$ represents a hydrolyzable silane moiety; $R_f$ represents a fluorinated moiety; r is at least 1; s is at least 1; and W is a linking group having a valency of r+s.

8. The method of claim 1, wherein the curable binder precursor comprises one or more (meth)acrylate or (meth)acrylamide monomers.

9. The method of claim 1, wherein the inorganic oxide comprises a mixture of a major amount of silica and a minor amount of at least one other inorganic oxide.

10. The method of claim 9, wherein the other inorganic oxide comprises alumina.

* * * * *